(12) United States Patent
Zimmerman, III et al.

(10) Patent No.: US 10,873,170 B2
(45) Date of Patent: Dec. 22, 2020

(54) AERIAL LIGHTING FIXTURE CONNECTOR

(71) Applicant: Ubicquia LLC, Wellington, FL (US)

(72) Inventors: Ronald B. Zimmerman, III, Wellington, FL (US); Ian B. Aaron, Wellington, FL (US); Bradford Brian Hutson, Wellington, FL (US); Jeffrey T. Root, Wellington, FL (US)

(73) Assignee: Ubicquia LLC, Wellington, FL (US)

( * ) Notice: Subject to any disclaimer, the term of this patent is extended or adjusted under 35 U.S.C. 154(b) by 0 days.

(21) Appl. No.: 16/403,324

(22) Filed: May 3, 2019

(65) Prior Publication Data

US 2019/0341732 A1 Nov. 7, 2019

Related U.S. Application Data

(60) Provisional application No. 62/667,392, filed on May 4, 2018.

(51) Int. Cl.
*H04B 10/00* (2013.01)
*H01R 33/94* (2006.01)
(Continued)

(52) U.S. Cl.
CPC .............. *H01R 33/94* (2013.01); *F21V 23/06* (2013.01); *H01R 33/90* (2013.01); *H01R 33/945* (2013.01);
(Continued)

(58) Field of Classification Search
None
See application file for complete search history.

(56) References Cited

U.S. PATENT DOCUMENTS

| 3,035,802 A | 5/1962 | Wyman et al. |
| 4,731,551 A | 3/1988 | Gibbs et al. |

(Continued)

FOREIGN PATENT DOCUMENTS

| KR | 20-2010-0009556 U | 9/2010 |
| WO | 2013/026008 A2 | 2/2013 |

(Continued)

OTHER PUBLICATIONS

TE Connectivity, "ANSI C136.41 Dimming Receptacle", Mar. 2014, All Pages.*

(Continued)

*Primary Examiner* — David C Payne
*Assistant Examiner* — Pranesh K Barua
(74) *Attorney, Agent, or Firm* — Seed IP Law Group LLP

(57) ABSTRACT

A system to couple a controller to a roadside aerial lighting fixture includes a primary male connector integrated with the controller and a primary female connector integrated with the roadside aerial lighting fixture. The primary male and female connectors are compliant with a roadway area lighting standard promoted by a standards body. The primary male connector protrudes from a first substantially planar surface of the controller. The primary female connector is recessed within a second substantially planar surface of the roadside aerial lighting fixture. A controller-side high speed communications data element is integrated with the primary male connector, and a fixture-side high speed communications data element is integrated with the primary female connector. The controller-side high speed communications data element is arranged for point-to-point high speed data communication with the fixture-side high speed communications data element when the controller is rotatably coupled to the roadside aerial lighting fixture.

15 Claims, 20 Drawing Sheets

(51) Int. Cl.
*F21V 23/06* (2006.01)
*H04B 10/2575* (2013.01)
*H01R 33/945* (2006.01)
*H01R 33/90* (2006.01)
*H05B 47/175* (2020.01)
*H04B 10/25* (2013.01)

(52) U.S. Cl.
CPC ... *H04B 10/2575* (2013.01); *H04B 10/25891* (2020.05); *H05B 47/175* (2020.01)

(56) References Cited

U.S. PATENT DOCUMENTS

| | | | |
|---|---|---|---|
| 6,366,379 B1 * | 4/2002 | Terahara | H04B 10/077 359/308 |
| 7,333,903 B2 | 2/2008 | Walters et al. | |
| 7,623,858 B2 | 11/2009 | Johnston, Jr. | |
| 7,723,862 B1 | 5/2010 | Spillman et al. | |
| 7,825,793 B1 * | 11/2010 | Spillman | G08B 25/009 340/539.1 |
| 8,290,710 B2 | 10/2012 | Cleland et al. | |
| 8,442,785 B2 | 5/2013 | Walters et al. | |
| 8,445,826 B2 | 5/2013 | Verfuerth | |
| 8,558,413 B1 * | 10/2013 | Lepard | H05B 47/19 307/150 |
| 8,820,952 B2 | 9/2014 | Agrawal | |
| 8,864,514 B2 * | 10/2014 | Ilyes | G08C 19/00 439/337 |
| 9,924,582 B2 | 3/2018 | Vendetti et al. | |
| 10,094,546 B2 | 10/2018 | Agrawal et al. | |
| 10,112,712 B1 | 10/2018 | Gentry et al. | |
| 10,238,001 B2 | 3/2019 | Agrawal et al. | |
| 10,314,147 B2 | 6/2019 | Agrawal | |
| 2002/0135315 A1 | 9/2002 | Puleo, Sr. et al. | |
| 2007/0013513 A1 | 1/2007 | Tang et al. | |
| 2007/0037516 A1 * | 2/2007 | Sawai | H04L 25/0268 455/41.1 |
| 2007/0258202 A1 * | 11/2007 | Cooley | H01R 31/065 361/679.4 |
| 2008/0175216 A1 | 7/2008 | Nasco | |
| 2009/0066258 A1 * | 3/2009 | Cleland | H02J 3/004 315/158 |
| 2009/0085487 A1 | 4/2009 | Braasch | |
| 2009/0222223 A1 | 9/2009 | Walters et al. | |
| 2010/0271178 A1 * | 10/2010 | Ahmad | H04Q 9/00 340/10.1 |
| 2011/0062888 A1 | 3/2011 | Bondy et al. | |
| 2011/0223783 A1 | 9/2011 | Pearson et al. | |
| 2011/0241559 A1 | 10/2011 | Grajcar | |
| 2012/0038490 A1 * | 2/2012 | Verfuerth | G08G 1/056 340/910 |
| 2012/0074641 A1 | 3/2012 | Murata | |
| 2012/0139426 A1 * | 6/2012 | Ilyes | H05B 47/105 315/152 |
| 2013/0015707 A1 | 1/2013 | Redmann | |
| 2013/0040471 A1 | 2/2013 | Gervais et al. | |
| 2013/0044488 A1 | 2/2013 | Hreish | |
| 2013/0064136 A1 | 3/2013 | Apostolakis | |
| 2013/0181609 A1 | 7/2013 | Agrawal | |
| 2013/0181614 A1 | 7/2013 | Agrawal | |
| 2013/0181636 A1 | 7/2013 | Agrawal | |
| 2014/0036473 A1 | 2/2014 | Agrawal | |
| 2014/0050483 A1 * | 2/2014 | Berlin | H04B 7/0426 398/115 |
| 2014/0197745 A1 | 7/2014 | Agrawal | |
| 2014/0198216 A1 | 7/2014 | Zhai et al. | |
| 2015/0032743 A1 | 1/2015 | Agrawal | |
| 2015/0124100 A1 | 5/2015 | McRory | |
| 2015/0173159 A1 | 6/2015 | Lin et al. | |
| 2016/0126629 A1 | 5/2016 | Cherrette et al. | |
| 2017/0013698 A1 | 1/2017 | Agrawal | |
| 2017/0045213 A1 | 2/2017 | Williams et al. | |
| 2017/0311424 A1 * | 10/2017 | Vendetti | H05B 45/10 |
| 2017/0336061 A1 * | 11/2017 | Riedel | F21V 23/0442 |
| 2018/0045388 A1 | 2/2018 | McDowell et al. | |
| 2018/0115751 A1 | 4/2018 | Noone | |
| 2018/0213671 A1 | 7/2018 | Riedel et al. | |
| 2018/0372376 A1 * | 12/2018 | Cartmill | F24H 9/2021 |
| 2019/0208660 A1 | 7/2019 | Agrawal et al. | |
| 2019/0313516 A1 * | 10/2019 | Cartmill | F21V 23/00 |

FOREIGN PATENT DOCUMENTS

| | | | |
|---|---|---|---|
| WO | 2017/184636 A1 | 10/2017 | |
| WO | 2017/200627 A1 | 11/2017 | |
| WO | 2017/210791 A1 | 12/2017 | |
| WO | 2019/136482 A1 | 7/2019 | |

OTHER PUBLICATIONS

International Search Report and Written Opinion, dated Mar. 22, 2019, for International Patent Application No. PCT/US2019/012777, 7 pages.

5G PPP Architecture Working Group, "View on 5G Architecture," Version 1.0, Jul. 2016, 61 pages.

Cisco Systems, Inc., "Cisco Smart+Connected City Multi-Sensor Core Node (External)," Data Sheet, 2015, 6 pages.

American National Standards Institute, Inc., "American National Standard for Roadway and Area Lighting Equipment—Dimming Control Between an External Locking Type Photocontrol and Ballast or Driver," ANSI C136.41—2013, National Electrical Manufacturers Association, Jan. 29, 2014, 7 pages.

"Huawei Connected City Lighting Solution," Huawei Technologies Co., Ltd., 2015, 8 pages.

Dack, "Smart Street Light Metering—Apr. 2017," Radian Research, 2017, 7 pages.

"LUMEWAVE: Wireless Outdoor Lighting Controller (TOP900 Series)," Echelon, DS-16001 rev Aug. 2001, 2 pages.

"Red Hat Openstack Platform: Modernize with a Virtualized Radio Access Network from Red Hat and Altiostar," Partner Solution Brief, Red Hat, Inc. & Altiostar, 2018, 2 pages.

* cited by examiner

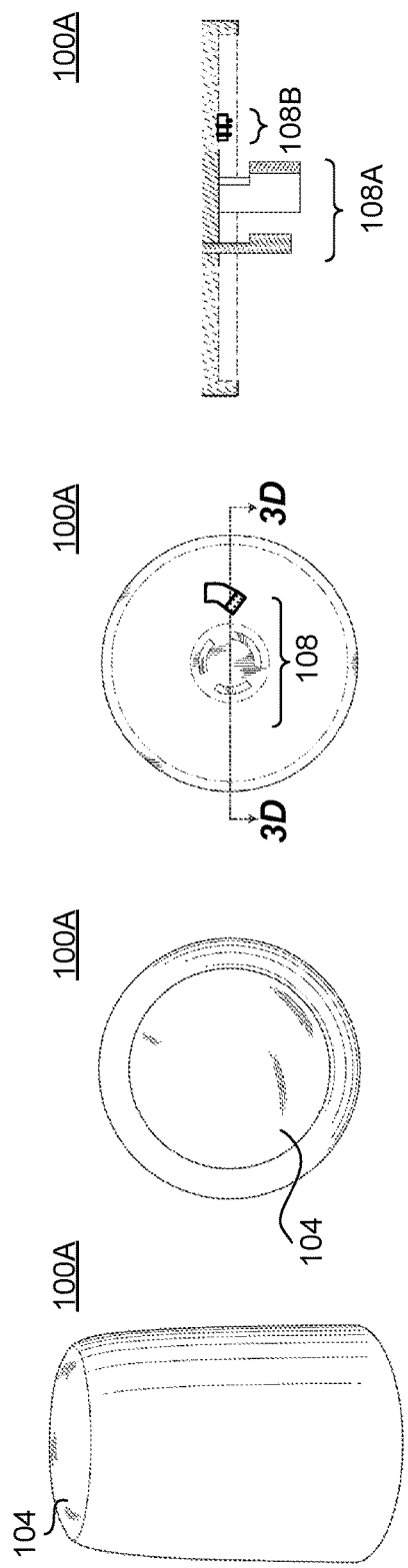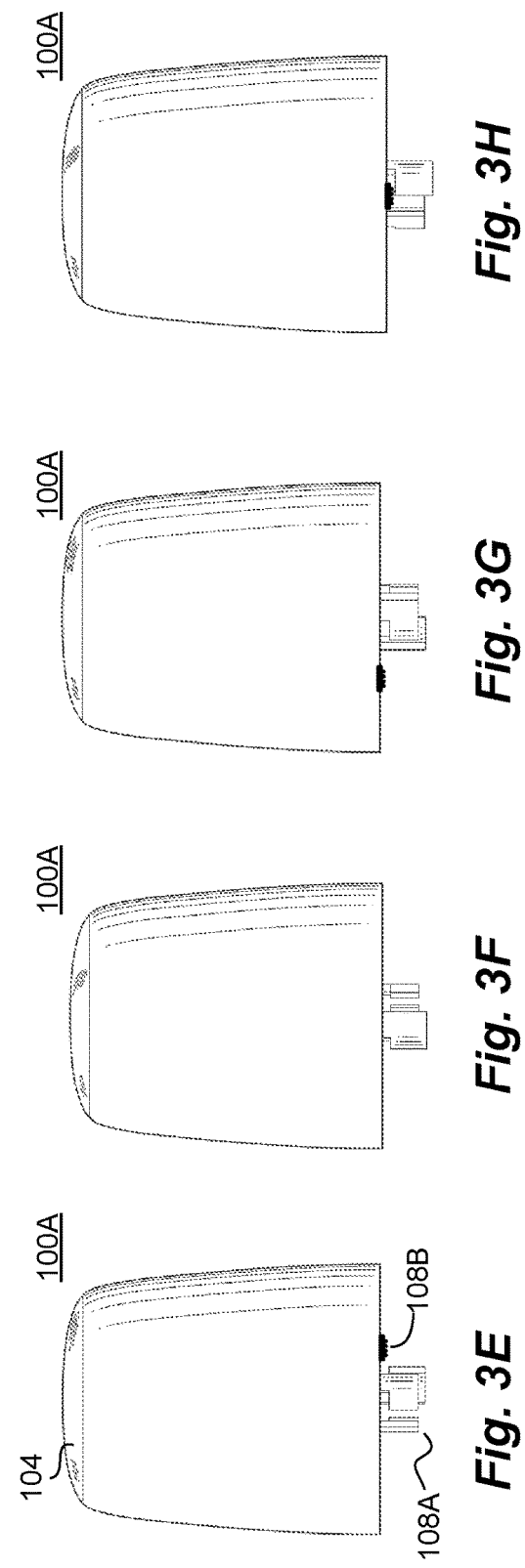

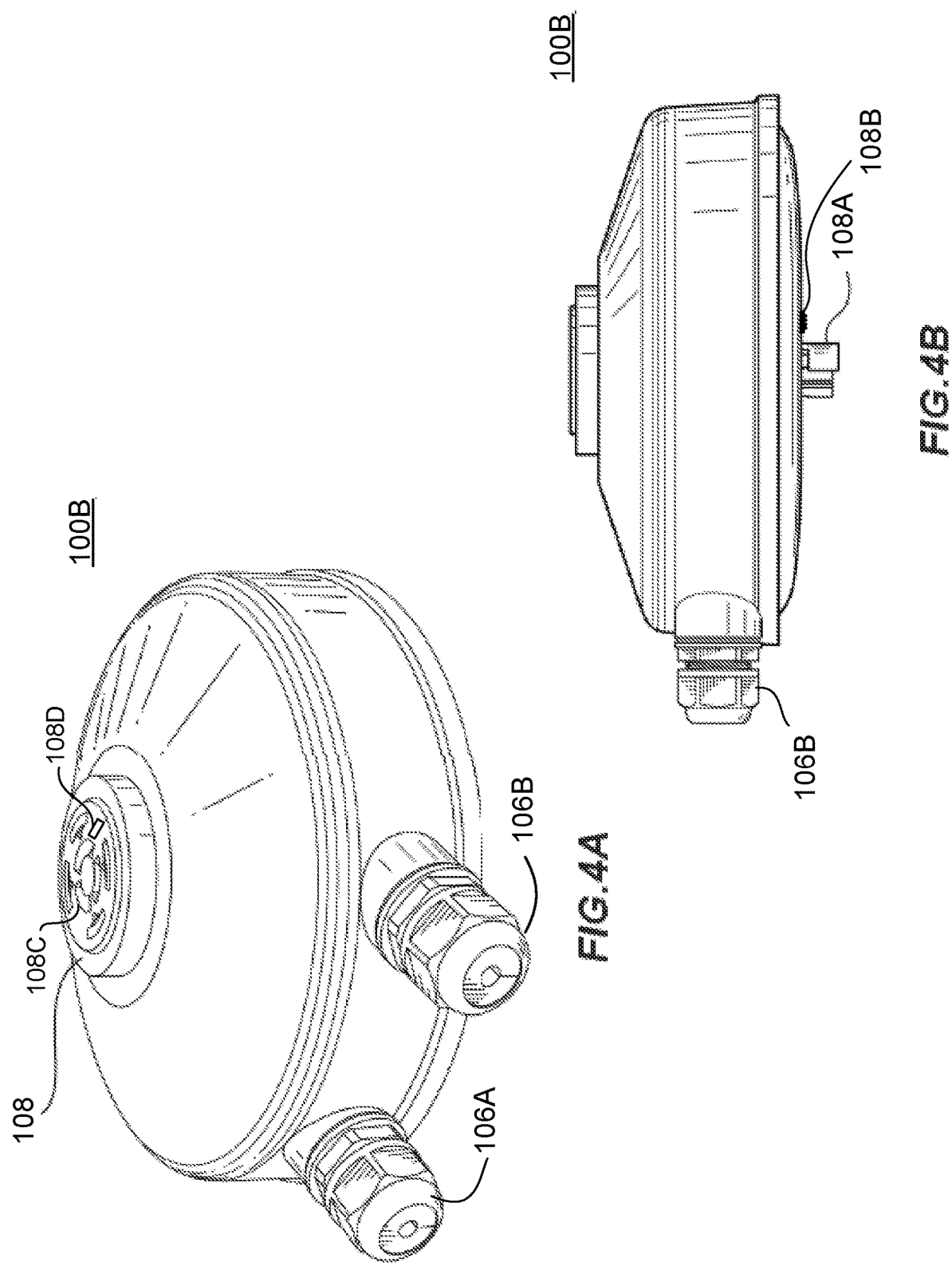

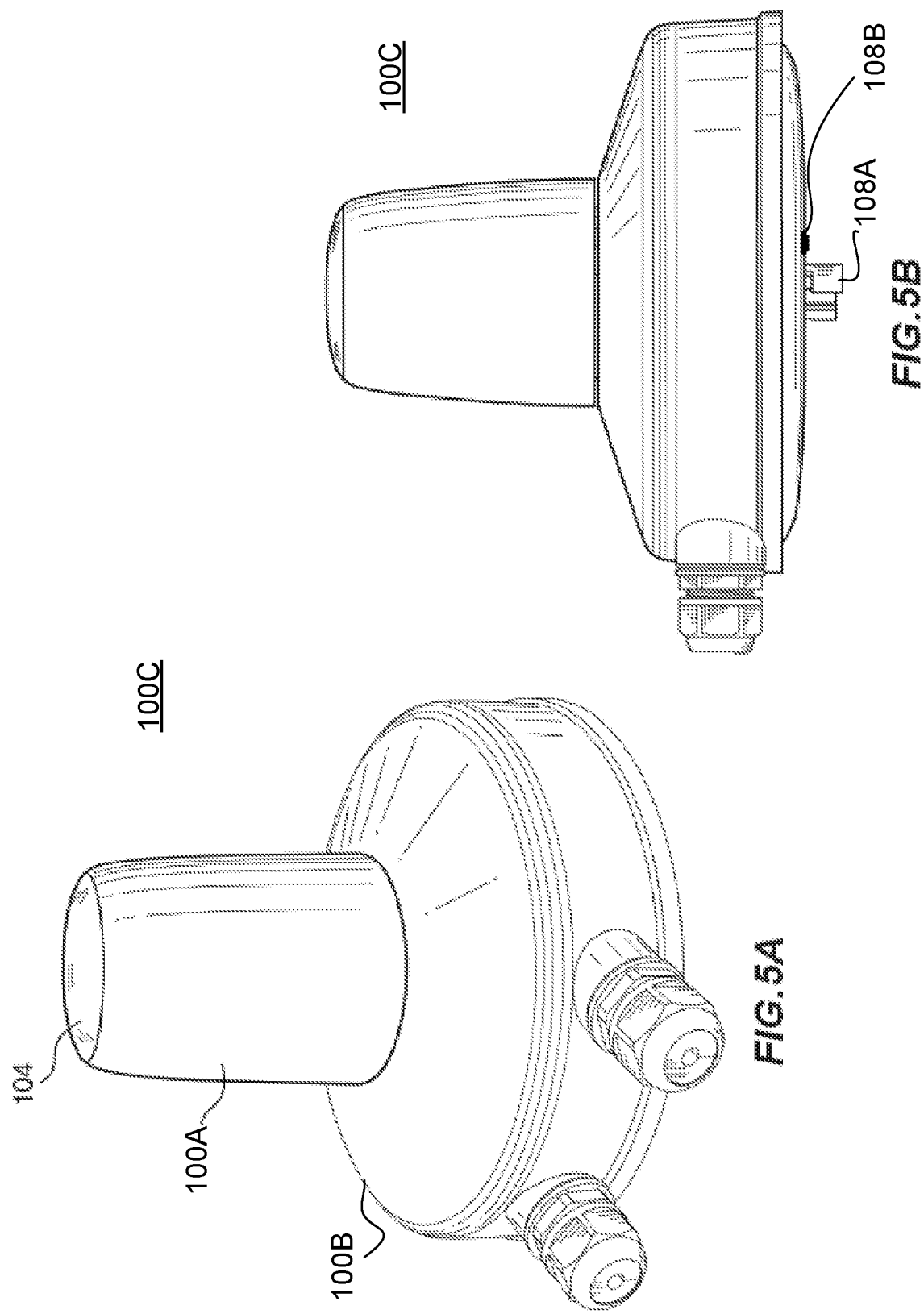

AERIAL LIGHTING FIXTURE CONNECTOR

CROSS-REFERENCE(S) TO RELATED APPLICATION(S)

This application claims the benefit of U.S. Provisional Patent Application No. 62/667,392, filed May 4, 2018, which is hereby incorporated by reference in its entirety.

BACKGROUND

Technical Field

The present disclosure generally relates to an aerial lighting fixture connector. More particularly, but not exclusively, the present disclosure relates to an aerial lighting fixture connector having a primary connector for supplying power to an illumination element and an ancillary connector for passing high speed data.

Description of the Related Art

Aerial lighting fixtures are known to include conventional light controllers. These conventional light controllers may be electric devices, mechanical devices, or electromechanical devices. Generally, if the controller detects an amount of light that is determined to be insufficient, the controller will direct the light source in the aerial lighting fixture to illuminate. On the other hand, if the controller detects an amount of light that is determined to be sufficient, the controller will direct the light source in the aerial lighting fixture to extinguish.

In many cases, the conventional light controller is coupled to the aerial lighting fixture via a standards-compliant connector. The connector may provide electric coupling, mechanical coupling, or electromechanical coupling.

The American National Standards Institute (ANSI) is a standards body that publishes and promotes standards for certain electrical equipment, mechanical equipment, and electromechanical equipment in use today. ANSI is a private, non-profit organization that oversees and administers development of voluntary consensus standards for products, services, processes, systems, protocols, and the like. It is also known that ANSI coordinates at least some U.S. standards with at least some international standards, which permits products manufactured according to U.S. standards to be used in other non-U.S. countries in the world.

Various standards developed by organizations, government agencies, consumer groups, companies, and others are accredited by ANSI. These standards are developed and promoted to provide consistent characteristics, definitions, terms, testing, implementation, and performance in products that are compliant with a given standard.

The National Electrical Manufacturers Association (NEMA) is one such organization that develops, promotes, or otherwise partners with ANSI. According to publicly available information, the NEMA is the largest trade association of electrical equipment manufacturers in the United States. NEMA is a consortium of several hundred member companies that manufacture products used in the generation, transmission, distribution, control, and end use of electricity. These products are used in utility, industrial, commercial, institutional, and residential applications including lighting products installed over roadways, parking lots, constructions sites, pedestrian malls, manufacturing floors, and the like. NEMA publishes standards documents, application guides, white papers, and other technical papers. NEMA also publishes and promotes several hundred technical standards for electrical enclosures, controllers, communication protocols, motors, wire, plugs, and receptacles among other equipment. Certain ones of NEMA's American National Standards directed toward Roadway and Area Lighting Equipment are referred to as ANSI C136 standards. At least one NEMA standard, referred to as ANSI C136.41, is directed to external locking type photo-control devices for street and area lighting.

All of the subject matter discussed in the Background section is not necessarily prior art and should not be assumed to be prior art merely as a result of its discussion in the Background section. Along these lines, any recognition of problems in the prior art discussed in the Background section or associated with such subject matter should not be treated as prior art unless expressly stated to be prior art. Instead, the discussion of any subject matter in the Background section should be treated as part of the inventor's approach to the particular problem, which, in and of itself, may also be inventive.

BRIEF SUMMARY

An aerial lighting fixture connector includes a primary, standards-compliant connector portion and a secondary connector portion. The primary connector portion may be arranged to comply with a standard promulgated by a standards body such as NEMA. One such standard to which the primary connector portion complies may be American National Standards Institute (ANSI) C136. In some cases, the primary connector portion is compliant with ANSI C136.41-2013. The secondary connector portion may or may not comply with a standard. In some cases, use of the secondary connector portion is in accordance with a standard such as Ethernet, USB, or some other high speed data communication format. When coupled together for concurrent use, the primary connector portion and the secondary connector portion described in the present disclosure may be referred to as an enhanced interface (EI) connector.

In a first embodiment, a system to couple a controller to a roadside aerial lighting fixture includes a primary male connector integrated with the controller and a primary female connector integrated with the roadside aerial lighting fixture, wherein the primary male connector is arranged for substantially permanent coupling to the primary female connector, wherein the primary male and female connectors are compliant with a roadway area lighting standard promoted by a standards body. Also included are first substantially planar surface integrated with the controller and having the primary male connector protruding therefrom, wherein electrical contacts of the primary male connector are arranged about a first central axis, the first central axis being substantially normal to the first substantially planar surface, and a second substantially planar surface integrated with the roadside aerial lighting fixture and having the primary female connector recessed therein, wherein electrical contacts of the primary female connector are arranged about a second central axis, the second central axis being substantially normal to the second substantially planar surface. The first embodiment further includes a controller-side data connector integrated with and protruding from the first substantially planar surface or a third surface substantially parallel to the first substantially planar surface and a fixture-side data connector integrated with and recessed within the second substantially planar surface or recessed within a fourth surface substantially parallel to the second substantially planar surface, wherein the primary male connector is electrically coupled to the primary female connector and the controller-side data connector is communicatively coupled to the fixture-side data connector when the controller is rotatably coupled to the roadside aerial lighting fixture.

In some cases of the first embodiment, the primary male and primary female connectors are compliant with American National Standards Institute (ANSI) C136, and in some cases, the primary male and primary female connectors are compliant with ANSI C136.41-2013. In these and other cases, the controller-side data connector and the fixture-side data connector may be multi-conduit connectors arranged to pass packetized digital data; and in still other cases, the controller-side data connector and the fixture-side data connector are optically based connectors.

In some cases of the first embodiment, the controller-side data connector has a semi-circular shape arranged about the first central axis, wherein the fixture-side data connector has a semi-circular shape arranged about the second central axis, and wherein the fixture-side data connector receives the controller-side data connector when the controller is rotatably coupled to the roadside aerial lighting fixture. In some cases, the controller-side data connector includes a plurality of pins and wherein the fixture-side data connector includes a plurality of sockets, wherein each of the plurality of pins of the controller-side data connector has a corresponding socket in the fixture-side data connector.

In some cases of the first embodiment, the controller-side data connector includes a plurality of spring contacts and wherein the fixture-side data connector includes a plurality of contacts, wherein each of the plurality of spring contacts of the controller-side data connector has a corresponding contact in the fixture-side data connector. And in some cases, the controller-side data connector includes a plurality of contacts and wherein the fixture-side data connector includes a plurality of contacts, wherein at least some of the plurality of contacts of the controller-side data connector or at least some of the plurality of contacts of the fixture-side data connector are spring contacts. In some cases, at least one of the controller-side data connector and the fixture-side data connector includes a registration feature, and in these or in other cases, the controller-side data connector is electromechanically coupled to the fixture-side data connector when the controller is rotatably coupled to the roadside aerial lighting fixture.

In some cases of the first embodiment, the primary male connector and the controller-side data connector are the only connectors associated with the first planar surface or the third surface. In some cases, the controller-side data connector is arranged to pass signals according to an Ethernet protocol, and in some cases, the controller-side data connector is arranged to pass signals according to a power-over-Ethernet (PoE) protocol.

In a second embodiment, an aerially mountable electronic control device, includes a first primary connector arranged for substantially permanent coupling to a corresponding second primary connector, wherein the first and second primary connectors are compliant with a roadway area lighting standard promoted by a standards body, a substantially planar surface having either protruding therefrom or recessed therein the first primary connector, wherein electrical contacts of the first primary connector are arranged about a central axis, the central axis being substantially normal to the planar surface, and integrated with the substantially planar surface or another surface parallel to the substantially planar surface, a first multi-conduit data connector arranged for substantially permanent coupling to a corresponding second multi-conduit data connector, wherein the first multi-conduit data connector is separate and distinct from the first primary connector.

In some cases of the second embodiment, the first multi-conduit data connector is arranged to partially rotate about the central axis when the aerially mountable electronic control device is rotatably coupled to a roadside aerial lighting fixture, said partial rotation arranged to form a communicative coupling between conduits of the first multi-conduit data connector and the corresponding second multi-conduit data connector. In these or in other cases, the first multi-conduit data connector includes any or all of a plurality of leaf spring contacts, a plurality of pins aligned substantially parallel to the central axis, and a plurality of pins aligned substantially parallel to the substantially planar surface.

In a third embodiment, a method includes the acts of controlling a light source of a roadside aerial lighting fixture with a controller that is electrically coupled to the roadside aerial lighting fixture via a primary male connector integrated with the controller and a primary female connector integrated with the roadside aerial lighting fixture, wherein the primary male and female connectors are compliant with a roadway area lighting standard promoted by a standards body and communicating control signals between the controller and the aerial lighting fixture, said control signals passing through a controller-side data connector integrated with the controller and a fixture-side data connector integrated with the roadside aerial lighting fixture, said controller-side data connector being communicatively coupled to the fixture-side data connector via the controller being rotatably coupled to the roadside aerial lighting fixture.

This Brief Summary has been provided to introduce certain concepts in a simplified form that are further described in detail below in the Detailed Description. Except where otherwise expressly stated, the Brief Summary does not identify key or essential features of the claimed subject matter, nor is it intended to limit the scope of the claimed subject matter.

BRIEF DESCRIPTION OF THE SEVERAL VIEWS OF THE DRAWINGS

Non-limiting and non-exhaustive embodiments are described with reference to the following drawings, wherein like labels refer to like parts throughout the various views unless otherwise specified. The sizes and relative positions of elements in the drawings are not necessarily drawn to scale. For example, the shapes of various elements are selected, enlarged, and positioned to improve drawing legibility. The particular shapes of the elements as drawn have been selected for ease of recognition in the drawings. One or more embodiments are described hereinafter with reference to the accompanying drawings in which:

FIGS. 3A-3H are various views of a first aerial control fixture embodiment having an enhanced interface (EI) connector;

FIGS. 4A-4B are various views of a second aerial control fixture embodiment having at least one enhanced interface (EI) connector;

FIGS. 5A-5B are various views of a third aerial control fixture embodiment having an enhanced interface (EI) connector;

FIG. 16 is a schematic of an interface embodiment between a first enhanced interface (EI) connector and a second EI connector.

DETAILED DESCRIPTION

Figure 1:
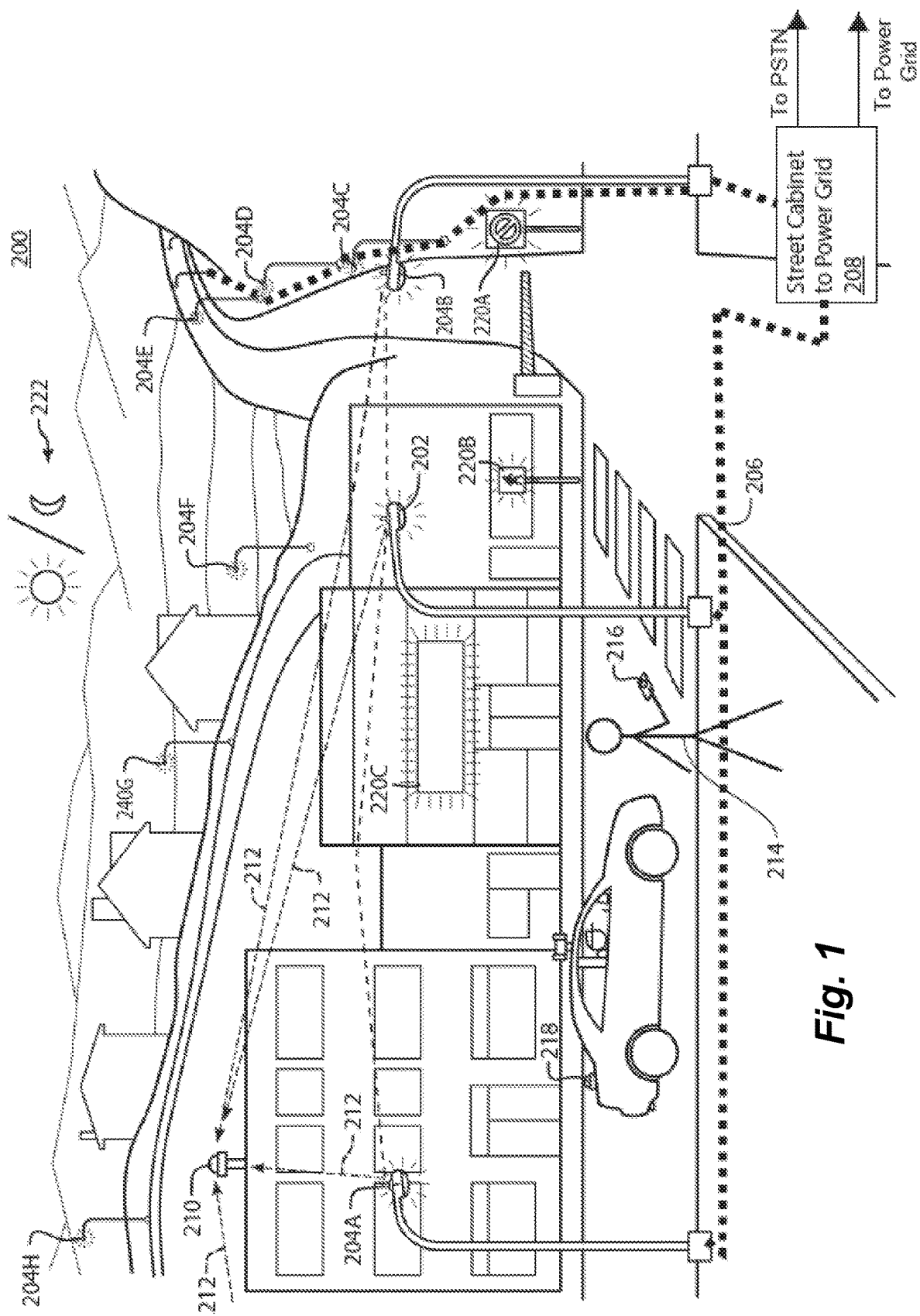
FIG. 1 is a system level deployment of aerial control fixtures coupled to streetlight fixtures.

An embodiment of the present invention is arranged as a system to couple an aerial control fixture (e.g., a "controller") to a roadside aerial lighting fixture (e.g., "light fixture"). The system includes an enhanced interface (EI) connector 108 (FIG. 8). The EI connector 108 has a primary connector that is compliant with a particular standard and a secondary connector that is used to pass control information. The control information may include any one or more of high speed data, low speed data, power, digital signals, analog signals, differential signals, and the like.

As the term is used herein, a primary connector is a type of connector that is additionally or alternatively used to pass power from a light control fixture to a light controller. A primary connector comprises two mating portions. When joined, the two mating portions form an electromechanical connection. Either or both of the two mating portions, separately and in combination, may be referred to using terms that include, plug, receptacle, receiver, connector, terminal, socket, pins, posts, pads, junctions, contacts, and other like terms. Either or both of the two mating portions may be referred to using terms that include, mating, joining, mated, joined, leader, follower, first, second, and other like terms. In some cases, a primary connector refers to both of the two mating portions as a single unit; in some other cases, each of the two portions may be individually referred to as a primary connector. Hence, the terms, "primary connector" and "primary connector portion," are in at least some cases used interchangeably. One of skill in the art will recognize that use of the term "primary connector" in one context or another does not depart from the inventive concepts disclosed herein. To simplify but not limit the present disclosure, however, the primary connector portion integrated with an aerial fixture control device will be described as a male connector, and the primary connector portion integrated with a light fixture will be described as a female connector.

In the EI connector, a primary male connector is integrated with the aerial control fixture and a primary female connector integrated with the roadside aerial lighting fixture. The primary male and female connectors are compliant with a roadway area lighting standard promoted by a standards body. The primary male connector protrudes from a first substantially planar surface of the controller. Electrical contacts of the primary male connector are arranged about a first central axis, which is substantially normal to the first substantially planar surface. The primary female connector is recessed within (e.g., below, under, through, or the like) a second substantially planar surface of the light fixture. Electrical contacts of the primary female connector are arranged about a second central axis, which is substantially normal to the second substantially planar surface. A controller-side secondary connector protrudes from the first substantially planar surface or a third surface substantially parallel to the first substantially planar surface. A light fixture-side secondary connector is recessed within the second substantially planar surface or recessed within a fourth surface substantially parallel to the second substantially planar surface. When the controller is rotatably coupled to the light fixture, the primary male connector is electrically coupled to the primary female connector, and the controller-side secondary connector is communicatively coupled to the fixture-side secondary connector.

In the present disclosure, the terms enhanced interface connector and EI connector are used interchangeably. In addition, an aerial control fixture structure having the primary and secondary connectors described herein may itself be referred to as an EI connector, and a roadside aerial lighting fixture having the primary and secondary connectors described herein may also be referred to as an EI connector. That is, either side of the system (i.e., the aerial control fixture side or the roadside aerial lighting fixture side) may be referred to as an EI connector, or the two sides together may be referred to as an EI connector.

The EI connector has a primary connector portion that is compliant with a particular standard and a secondary connector portion that may or may not be compliant with a particular standard. For example, the primary connector portion may be compliant with a NEMA American National Standard directed toward Roadway and Area Lighting Equipment (i.e., ANSI C136) such as ANSI C136.41, ANSI C136.41-2013, or some other standard. The secondary connector portion may be compliant with Ethernet, Digital Visual Interface (DVI), High Definition Media Interface (HDMI), Universal Serial Bus (USB), Serial Digital Interface (SDI) a propriety standards protocol, or a non-standard protocol. In some cases, one or more portions of the secondary connector interface may be compliant with a particular standard, and one or more other portions of the secondary connector interface may be used in a different way.

The present invention may be understood more readily by reference to this detailed description of the invention. The terminology used herein is for the purpose of describing specific embodiments only and is not limiting to the claims unless a court or accepted body of competent jurisdiction determines that such terminology is limiting. Unless specifically defined herein, the terminology used herein is to be given its traditional meaning as known in the relevant art.

In the following description, certain specific details are set forth in order to provide a thorough understanding of various disclosed embodiments. However, one skilled in the relevant art will recognize that embodiments may be practiced without one or more of these specific details, or with other methods, components, materials, etc. Also in these instances, well-known structures may be omitted or shown and described in reduced detail to avoid unnecessarily obscuring descriptions of the embodiments.

FIG. 1 is a system level deployment 200 of aerial control fixtures coupled to streetlight fixtures. The streetlight fixtures are coupled to or otherwise arranged as part of a system of streetlight poles, and each streetlight fixture includes a light source. Each light source, light fixture, and light fitting, individually or along with their related components, may in some cases be interchangeably referred to as a luminaire, a light source, a streetlight, a streetlamp, or some other such suitable term. Those of ordinary skill in the art will understand that aerial control fixtures as described herein do not need to be directly coupled to streetlight fixtures and instead such aerial control fixtures can be coupled to buildings, towers, masts, signage, or any other suitable aerial platform. Nevertheless, for simplicity in the description, aerial control fixtures described herein are coupled to streetlight fixtures.

As shown in the system level deployment 200, a plurality of light poles are arranged in one or more determined geographic areas, and each light pole has at least one light source positioned in a fixture. The fixture is at least twenty feet above ground level and in at least some cases, the fixtures are between about 20 feet and 40 feet above ground level. In other cases, the streetlight fixtures may of course be lower than 20 feet above the ground or higher than 40 feet above the ground.

The system of streetlight poles, streetlight fixtures, streetlight sources, or the like in the system level deployment may be controlled by a municipality or other government agency. In other cases, the system streetlight poles, streetlight fixtures, streetlight sources, or the like in the system level deployment is controlled by a private entity (e.g., private property owner, third-party service contractor, or the like). In still other cases, a plurality of entities share control of the system of streetlight poles, streetlight fixtures, streetlight sources, or the like. The shared control may be hierarchical or cooperative in some other fashion. For example, when the system is controlled by a municipality or a department of transportation, an emergency services agency (e.g., law enforcement, medical services, fire services) may be able to request or otherwise take control of the system. In still other cases, one or more sub-parts of the system of streetlight poles, streetlight fixtures, streetlight sources, or the like can be granted some control such as in a neighborhood, around a hospital or fire department, in a construction area, or in some other manner.

In the system level deployment 200 of FIG. 1, any number of streetlight fixtures may be arranged with an enhanced interface (EI) connector 108 (FIG. 8) having at least one connector portion that is compliant with a roadway area lighting standard promoted by a standards body. The EI connector permits the controlling or servicing authority of the system to competitively and efficiently purchase and install light sensors on each streetlight fixture. In addition, or in the alternative, the EI connector in each streetlight fixture permits the controlling or servicing authority to replace conventional light sensors with other devices such as aerial control fixtures (FIGS. 2-7).

In the system level deployment 200, an aerial control fixture arranged as a small cell networking device may be electromechanically coupled to a selected light pole or other suitable aerial platform as described in the present disclosure wherein the electromechanical coupling is performed via the portion of the EI connector that is compliant with the roadway area lighting standard promoted by a standards body. A plurality of light poles may also have aerial control fixtures arranged as smart sensor devices 204A-204H. In these light poles 204A-204H, each streetlight fixture is equipped with an aerial control fixture arranged as a smart sensor device (i.e., aerial control fixture 100A embodiment in FIGS. 3, 5, and 6) that is electromechanically coupled via a respective EI connector having at least one portion that is compliant with the roadway area lighting standard promoted by the standards body. In this arrangement, each streetlight 202, 204A-204H is equipped with an aerial control fixture arranged as a light sensor that is further electrically coupled to a processor-based light control circuit.

The processor-based light control circuit of each aerial control fixture smart device is arranged to provide a light control signal to its respective light source based on at least one ambient light signal generated by its associated the light sensor. In addition, because each streetlight 202, 204A-204H is equipped with communication capabilities, each light source in each streetlight 202, 204A-204H can be controlled remotely as an independent light source or in combination with other light sources. In these cases, each of the plurality of light poles with aerial control fixtures arranged as smart sensor devices 204A-204H may be communicatively coupled to the light pole and aerial control fixture arranged as a small cell networking device 202. The communicative relationship from each of the plurality of light poles and aerial control fixture arranged as a smart sensor device 204A-204H to the light pole and aerial control fixture arranged as a small cell networking device 202 may be a direct communication or an indirect communication. That is, in some cases, one of the plurality of light poles and aerial control fixtures arranged as a smart sensor device 204A-204H may communicate directly to the light pole and with aerial control fixture arranged as a small cell networking device 202 or the one of the plurality of light poles and aerial control fixture arranged with a smart sensor device 204A-204H may communicate via one or more other ones of the plurality of light poles and aerial control fixtures arranged as a smart sensor device 204A-204H.

In the system level deployment 200 of FIG. 1, various ones of the light poles may be 50 feet apart, 100 feet apart, 250 feet apart, or some other distance. In some cases, the type and performance characteristics of each small cell networking device and each smart sensor device are selected based on their respective distance to other such devices such that wireless communications are acceptable.

The light pole and aerial control fixture arranged as a small cell networking device 202 and each light pole and aerial control fixture arranged as a smart sensor device 204A-204H may be coupled to a street cabinet 208 or other like structure that provides utility power (e.g., "the power grid") in a wired way. The coupling includes electrical coupling via a primary connector portion of an EI connector. The coupling may also include data coupling via a secondary connector portion of the EI connector. The utility power may provide 120 VAC, 208 VAC, 220 VAC, 240 VAC, 260 VAC, 277 VAC, 360 VAC, 415 VAC, 480 VAC, 600 VAC, or some other power source voltage. In addition, the light pole and aerial control fixture arranged as a small cell networking device 202, and optionally one or more of the light poles and aerial control fixtures arranged as smart sensor devices 204A-204H, are also coupled to the same street cabinet 208 or another structure via a wired backhaul connection. It is understood that these wired connections are in some cases separate wired connections (e.g., copper wire, fiber optic cable, industrial Ethernet cable, or the like) and in some cases combined wired connections (e.g., power over Ethernet (PoE), powerline communications, or the like). For simplification of the system level deployment 200 of FIG. 1, the wired backhaul and power line 206 is illustrated as a single line. The street cabinet 208 is coupled to the power grid, which is administered by a licensed power utility agency, and the street cabinet 208 is coupled to the public switched telephone network (PSTN).

Each light pole and aerial control fixture arranged as a smart sensor device 204 may be in direct or indirect wireless communication with the light pole and aerial control fixture arranged as a small cell networking device 202. In addition, each light pole and aerial control fixture arranged as a smart sensor device 204 and the light pole and aerial control fixture arranged as a small cell networking device 202 may also be in direct or indirect wireless communication 212 with an optional remote computing device 210. The remote computing device 210 may be controlled by a mobile network operator (MNO), a municipality, another government agency, a third party, or some other entity. By this optional arrangement the remote computing device can be arranged to wirelessly communicate light control signals and any other information (e.g., packetized data) between itself and each respective wireless networking device coupled to any of the plurality of light poles.

A user 214 holding a mobile device 216 is represented in the system level deployment 200 of FIG. 1. A vehicle having an in-vehicle mobile device 218 is also represented. The vehicle may be an emergency service vehicle, a passenger vehicle, a commercial vehicle, a public transportation vehicle, a drone, or some other type of vehicle. The user 214 may use their mobile device 216 to establish a wireless communication session over a cellular-based network controlled by an MNO, wherein packetized wireless data is passed through the light pole and aerial control fixture arranged as a small cell networking device 202. Concurrently, the in-vehicle mobile device 218 may also establish a wireless communication session over the same or a different cellular-based network controlled by the same or a different MNO, wherein packetized wireless data of the second session is also passed through the light pole and aerial control fixture arranged as a small cell networking device 202.

Other devices may also communicate through light pole-based devices of the system level deployment 200. These devices may be internet of things (IoT) devices or some other types of devices. In FIG. 1, two public information signs 220A, 220B, and a private entity sign 220C are shown, but many other types of devices are contemplated. Each one of these devices may form an unlicensed wireless communication session (e.g., WiFi) or a cellular-based wireless communication session with one or more wireless networks made available by the devices shown in the system level deployment 200 of FIG. 1.

The sun and moon 222 are shown in FIG. 1. Light or the absence of light based on time of day, weather, geography, or other causes provide information (e.g., ambient light) to the light sensors of the light pole mounted devices described in the present disclosure. Based on this information, the associated light sources may be suitably controlled.

Figure 2:
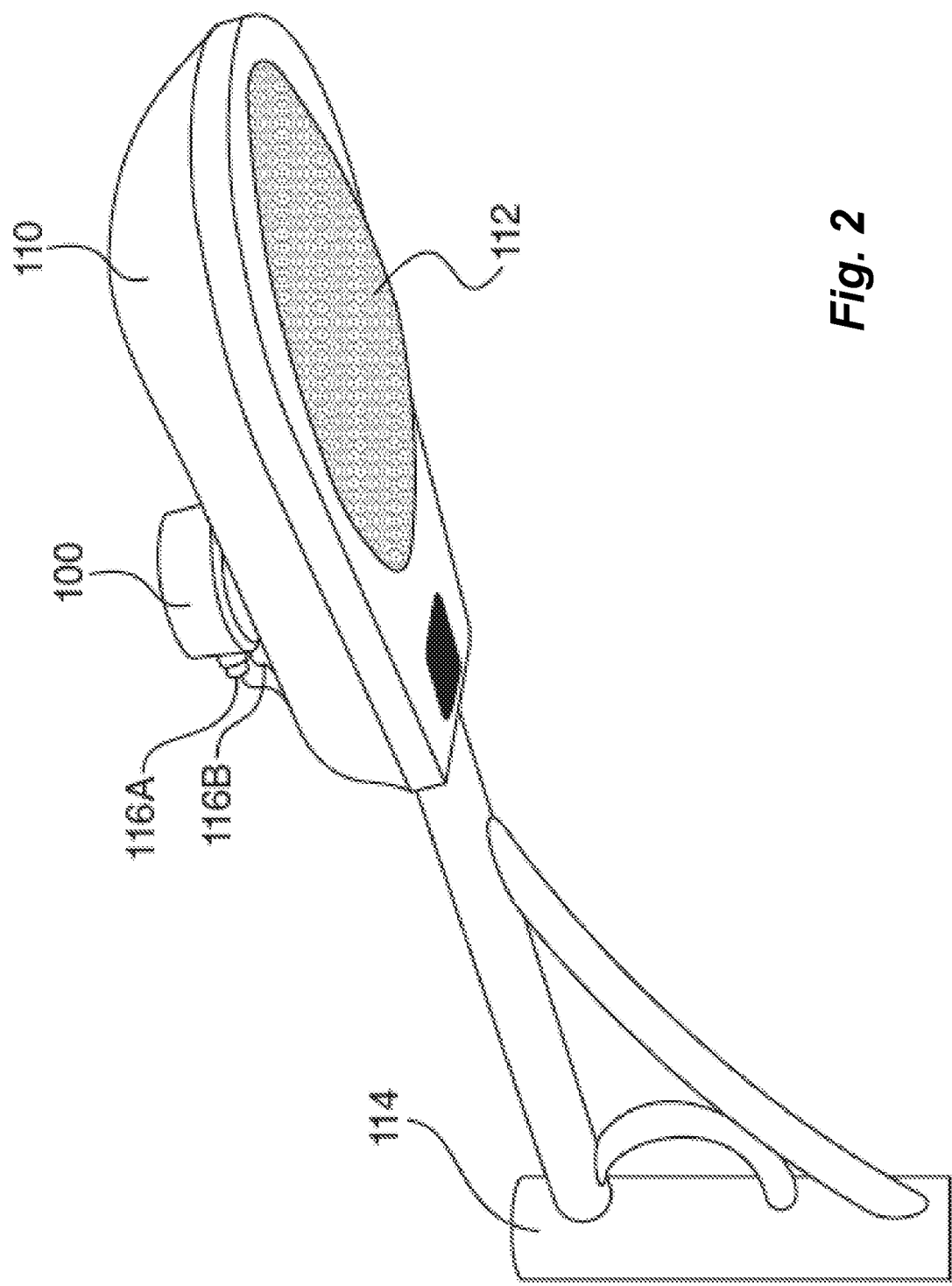
FIG. 2 is one aerial control fixture embodiment mounted on a light fixture, which itself is coupled to a light pole.

FIG. 2 is an aerial control fixture 100 mounted on a light fixture 110, which itself is coupled to an aerial platform. The aerial platform in FIG. 2 is a light pole 114, however many other aerial platforms are also contemplated. The aerial control fixture 100 of FIG. 2 is arranged as a small cell networking device, but in other embodiments, the aerial control fixture 100 is arranged as a smart sensor device 100A (FIG. 3), a small cell or other wireless networking device 100B (FIG. 4), a combination device 100C (FIG. 5), or some other control device. The light fixture 110 includes a light source 112. The light source 112 may be an incandescent light source, a light emitting diode (LED) light source, a high pressure sodium lamp, or any other type of light source. In the non-limiting street light embodiment of FIG. 2, the aerial control fixture 100 is coupled to the light fixture 110 via a multi-pin enhanced interface (EI) connector 108 (FIG. 8). That is, the pins of the standards-based portion of EI connector 108 are electromechanically coupled to a compatible standards-based receptacle portion of the EI connector 108 integrated into the light fixture 110. In some cases, the aerial control fixture 100 replaces or otherwise takes the place of a different light sensor device, which does not have the features provided by the aerial control fixture 100. Optional cables 116A, 116B are passed through twist lock connectors 106A, 106B respectively of the aerial control fixture 100. The cables 116A, 116B may be networking cables (e.g., Power over Ethernet (PoE)) cables, cables electrically coupled to other electronic circuits (e.g., cameras, transducers, weather devices, internet of things (IoT) devices, or any other type of device).

FIGS. 3A-3H are various views of a first aerial control fixture 100A embodiment having an enhanced interface (EI) connector 108. FIGS. 3A-3H may be collectively referred to as FIG. 3. The aerial control fixture embodiment of FIG. 3 is arranged as a smart sensor device. FIG. 3A is a perspective view of the aerial control fixture 100A embodiment. FIGS. 3B and 3C are top and bottom views, respectively, of the aerial control fixture 100A embodiment. FIG. 3D is a cross-sectional view of the aerial control fixture 100A embodiment across 3D-3D in FIG. 3C. FIGS. 3E-3H are front, right side, rear, and left side views of the aerial control fixture 100A embodiment.

The first aerial control fixture 100A embodiment of FIG. 3 includes a light sensor module 104. The first aerial control fixture 100A may also include non-cellular-based wireless capabilities (e.g., WiFi, Bluetooth, etc.), local edge processing capabilities, and other features. In this way, the first aerial control fixture 100A may work as a traditional light sensor for its associated light source, and the first aerial control fixture 100A may provide other "smart" services. The first aerial control fixture 100A, for example, may receive directions or other control information from a small cell networking device, from a mobile device, from another first aerial control fixture 100A, or from some other source. The first aerial control fixture 100A may also have one or more embedded algorithms that direct operations of an associated light source such as variable illumination based on time, season, external conditions, motion detection, sound detection, or the like. The first aerial control fixture 100A may have one or more sensors coupled thereto that provide actionable sensor input data that is used to control the associated light source. In still other cases, the first aerial control fixture 100A is arranged as a WiFi access point, a WiFi point in a mesh network, or some other wireless data gateway.

The first aerial control fixture 100A embodiment of FIG. 3 may be coupled directly to a light fixture or the first aerial control fixture 100A embodiment may be coupled to another device such as a second aerial control fixture 100B embodiment (FIG. 4), which is arranged as a small cell or other wireless networking device.

As evident in the bottom view of FIG. 3C, the aerial control fixture 100A embodiment includes an enhanced interface (EI) connector 108. The EI connector 108 has a primary connector portion 108A and a secondary connector portion 108B (FIG. 3D).

The primary connector portion 108A (FIG. 3D) in some cases is compliant with a particular standard. In some cases, the primary connector portion 108A is a multi-pin NEMA connector that is compliant with an ANSI C136.41 standard. In other cases, the primary connector portion 108A is compliant with a different ANSI standard or some other standard altogether. As represented in the present disclosure, the primary connector portion 108A is arranged as a set of pins of a particularly selected size and shape arranged in a generally circular pattern about a first central axis. It is contemplated, however, that in some embodiments, the primary connector portion 108A is arranged as a set of receptacles, a set of pads, a combination of pins and receptacles, or some other means.

The secondary connector portion 108B (FIG. 3D) may or may not be compliant with a particular standard. In some cases, the secondary connector portion 108B may be arranged to pass digital packetized information (e.g., Ethernet, Digital Visual Interface (DVI), High Definition Media Interface (HDMI), Universal Serial Bus (USB), Serial Digital Interface (SDI)). In other cases, the secondary connector portion 108B may be arranged to pass information using a propriety standards protocol or a non-standard protocol. In some cases, one or more signal conduits of the secondary connector portion 108B interface may be compliant with multiple protocols (e.g., Ethernet and USB). In still other cases, the multiple conduits of the secondary connector portion 108B may be configurable. The configuration may be by user interface, manufacturing interface, network interface, computerized interface, auto-negotiation, prioritized selection, or by any other means.

The secondary connector portion 108B may be arranged in various embodiments as a set of receptacles, a set of pads, a combination of pins and receptacles, spring contacts, leaf spring contacts, pogo pins, or connectors implemented by any other desirable means. In the present disclosure, the secondary connector portion 108B is arranged proximate to the primary connector portion 108A. The two portions may be integrated in a same housing, a same plane, parallel planes, or in any other desirable manner. In the present disclosure, the secondary connector portion 108B may be referred to as a controller side data connector.

To simplify the drawings of FIG. 3, it is recognized that various elements of the aerial control fixture 100A embodiment arranged as a smart sensor device are not identified in each illustration. For example, the light sensor module 104 is identified in FIGS. 3A and 3B, but the light sensor module 104 is not identified in FIGS. 3E-3H even though it is readily apparent. Other structural elements in FIG. 3 and other figures of the present disclosure may also be simplified in this way.

FIGS. 4A-4B are various views of a second aerial control fixture embodiment 100B having at least one enhanced interface (EI) connector 108. FIGS. 4A-4B may be collectively referred to as FIG. 4. In some cases, the second aerial control fixture embodiment 100B is arranged as a wireless networking device of a type described in U.S. Provisional Patent Application No. 62/614,918, filed Jan. 8, 2018, which is incorporated herein by reference, and which is assigned to the same assignee as the present application.

The second aerial control fixture embodiment 100B may include one or more light sensors. Light sensors detect ambient light in proximity to the streetlight fixture. Using light sensor data, the smart devices described herein may control one or more characteristics of light produced by a light source mounted or otherwise integrated in the fixture. The characteristics can include the volume of light output (i.e., lumens or luminous flux), the color or frequency of output light, on/off timing, situational lighting, and the like. In at least some cases, the characteristics of light output from one streetlight fixture are cooperative with characteristics of light output from other (e.g., adjacent) streetlight fixtures.

In addition to certain streetlight control features, the aerial control fixture embodiment 100B arranged as a small cell networking device described herein may also provide cellular-based wireless communication services to mobile devices. For example, a user holding a smartphone can make or receive a telephone call that passes wireless cellular data through the aerial control fixture embodiment 100B. Using such an aerial control fixture embodiment 100B arranged as a small cell networking device, a mobile network operator (MNO) can supplement its cellular-based network with coverage in dense urban areas, areas in geographic regions that are otherwise "dark spots" in its network (e.g., valleys, places in the shadow of natural or manmade structures), in areas that are only periodically high-traffic areas (e.g., stadiums, arenas, show venues), in areas that are temporary (e.g., construction sites, disaster sites), and in other such areas.

In some cases, a single aerial control fixture embodiment 100B arranged as a small cell networking device may include electronic circuits that provide small cell functionality to two or more MNOs in a single device. For example, in some cases, a single small cell networking device may have antennas, transceivers, controllers, and the like that permit two mobile devices provisioned for wireless communications on different cellular-based networks operated by different MNOs to carry on concurrent communication sessions (e.g., phone calls, internet sessions, etc.).

In some cases, the aerial control fixture embodiment 100B also provides WiFi access point services to devices that are in proximity to the aerial control fixture embodiment 1008. These WiFi services are distinguished from cellular-based wireless communications because they do not necessarily require MNO provisioning in the manner that a mobile communication device requires provisioning. In these cases, for example, an aerial control fixture embodiment 1008 may provide cellular-based service for a specific MNO, and the same aerial control fixture embodiment 1008 may also provide WiFi services on behalf of a municipality that wants to provide free or low cost WiFi services to its residents.

The smart networking devices described herein may in some cases be in communication with other smart networking devices or other less sophisticated wireless communication devices. In at least one case, a geographic area has many streetlight poles. Some small cell networking devices are mounted on certain ones of the streetlight poles, and other less sophisticated wireless communication devices are mounted on other streetlight poles. These other less sophisticated wireless communication devices can each control characteristics of the light sources integrated on their respective light pole. In this type of system, however, due in part to the wireless capabilities of each device, and due in part to the sophistication of the aerial control fixture embodiment 1006, the lighting of the entire geographic area can be desirably and holistically controlled locally from the small cell networking device or remotely from a central site. And in still other systems of this configuration enable the implementation and control of a wide range of sensors, controllers, and other "smart" devices can be integrated to provide MNOs, utilities, government agencies, and the like with a range of services not previously available.

FIG. 4A is a perspective view of an aerial control fixture embodiment 1006. The aerial control fixture embodiment 100B may be particularly arranged for mounting on an aerial platform, such as a light pole, and even more particularly arranged for mounting on a light fixture (e.g., a luminaire) via an enhanced interface (EI) connector 108. In these cases, the light fixture in at least some embodiments is aerially mounted between about 20 to 40 feet above the area to be illuminated (e.g., ground level, a roadway, a parking surface, and the like), and the light fixture is mounted on a light pole, a building, or some other structure (i.e., aerial platform). In some cases, the light poles, light fixtures, streetlights, buildings, roadways, parking surfaces, or any combination of such aerial platforms are administered by a government entity.

In FIG. 4A, the aerial control fixture embodiment 100B may optionally include any number of access portals or connectors. In FIG. 4A, a pair of twist lock connectors 106A, 106B are optionally included to provide cable access to the inside of the aerial control fixture embodiment 1006. In at least some cases, the twist lock connectors 106A, 106B are water tight, and in these or in other cases, the twist lock connectors 106A, 106B provide strain relief to cables that pass through the connectors. The twist lock connectors 106A, 106B in at least some cases expose a gland connector for 3-15 mm diameter cable resistant to foreign material ingress according to Ingress Protection standard IP67.

The aerial control fixture embodiment 100B in FIG. 4 includes two enhanced interface (EI) connectors 108. A first enhanced interface (EI) connector 108 is arranged at the top of the aerial control fixture embodiment 1006. A second enhanced interface (EI) connector 108 is arranged at the bottom of the aerial control fixture embodiment 1006.

The first enhanced interface (EI) connector 108 arranged at the top of the aerial control fixture embodiment 1006 (FIG. 4A) includes a primary connector portion 108C and a secondary connector portion 108D. Considering the enhanced interface (EI) connector 108 of FIG. 3, it is recognized that the primary connector portion 108A (FIG. 3D) is arranged to mate with a primary connector portion 108C (FIG. 4A). For example, if primary connector portion 108A is arranged as set of pins, then primary connector portion 108C is arranged as a corresponding set of receptacles. Along these lines, it is recognized that the secondary connector portion 108B (FIG. 3D) is arranged to mate with a secondary connector portion 108D (FIG. 4A). Hence, if secondary connector portion 108B is arranged as a protruding controller-side data connector, then secondary connector portion 1084 is arranged as a corresponding recessed fixture-side data connector.

In the aerial control fixture embodiment 100B of FIG. 4A, the primary connector portion 108C is arranged as an integrated multi-pin NEMA receiver. Though not expressly marked, the multi-pin NEMA receiver embodiment of FIG. 4A includes three receptacles (e.g., holes, apertures, or the like), which are arranged to electromechanically receive three pins of a compatible NEMA connector (e.g., a primary connector portion 108A configured as a multi-pin NEMA connector). In some embodiments, other signals are also passed through the EI connector 108 (i.e., primary connector portion 108A, primary connector portion 108C). Hence, the EI connector 108 may include one or more contacts to pass power, control, or other signals, such as a plurality of low power direct current (e.g., 0 VDC to 10 VDC) dimming control signals.

The second enhanced interface (EI) connector 108 arranged at the bottom of the aerial control fixture embodiment 100B (FIG. 4B) includes a primary connector portion 108A and a secondary connector portion 108D along the lines of the connector illustrated in FIG. 3.

FIG. 4B is a right side view of the aerial control fixture embodiment 100B embodiment of FIG. 4A. The outer housing and one of the twist lock connectors 106B are apparent in the figure. Also identified in FIG. 4B are the first and second portions of the EI connector 108. The first portion is a primary connector portion 108A arranged as a multi-pin NEMA connector. In at least some embodiments the multi-pin NEMA connector is compatible with an ANSI C136 standard promulgated by the National Electrical Manufacturers Association (NEMA). The multi-pin NEMA connector may be compatible with the standard referred to as ANSI C136.41, ANSI C136.41-2013, or some other standard. Alternatively, the multi-pin NEMA connector may be implemented with some other connector useful for external locking type photo-control devices for street and area lighting.

FIGS. 5A-5B are various views of a third aerial control fixture embodiment 100C arranged as a combination device and having an enhanced interface (EI) connector. FIGS. 5A-5B may be collectively referred to as FIG. 5

FIG. 5A is a perspective view of still another aerial control fixture 100C arranged as a combination device, and FIG. 5B is a right side view of the aerial control fixture 100C embodiment of FIG. 5A. Structures of the aerial control fixture 100C that are along the lines of corresponding structures in the first and second aerial control fixtures 100A, 100B of FIG. 3 and FIG. 4 are not identified so as to not obscure different features in the device. In some cases, the aerial control fixture 100C may be formed as a single unit, and in other cases, the aerial control fixture 100C may be formed as an aerial control fixture 100B (FIG. 4) having an aerial control fixture 100A (e.g., a smart sensor device) coupled thereto via a second separate and distinct EI connector 108. As evident, the aerial control fixture 100C may be formed with an aerial control fixture 100A coupled to an aerial control fixture 1006.

Figure 6:
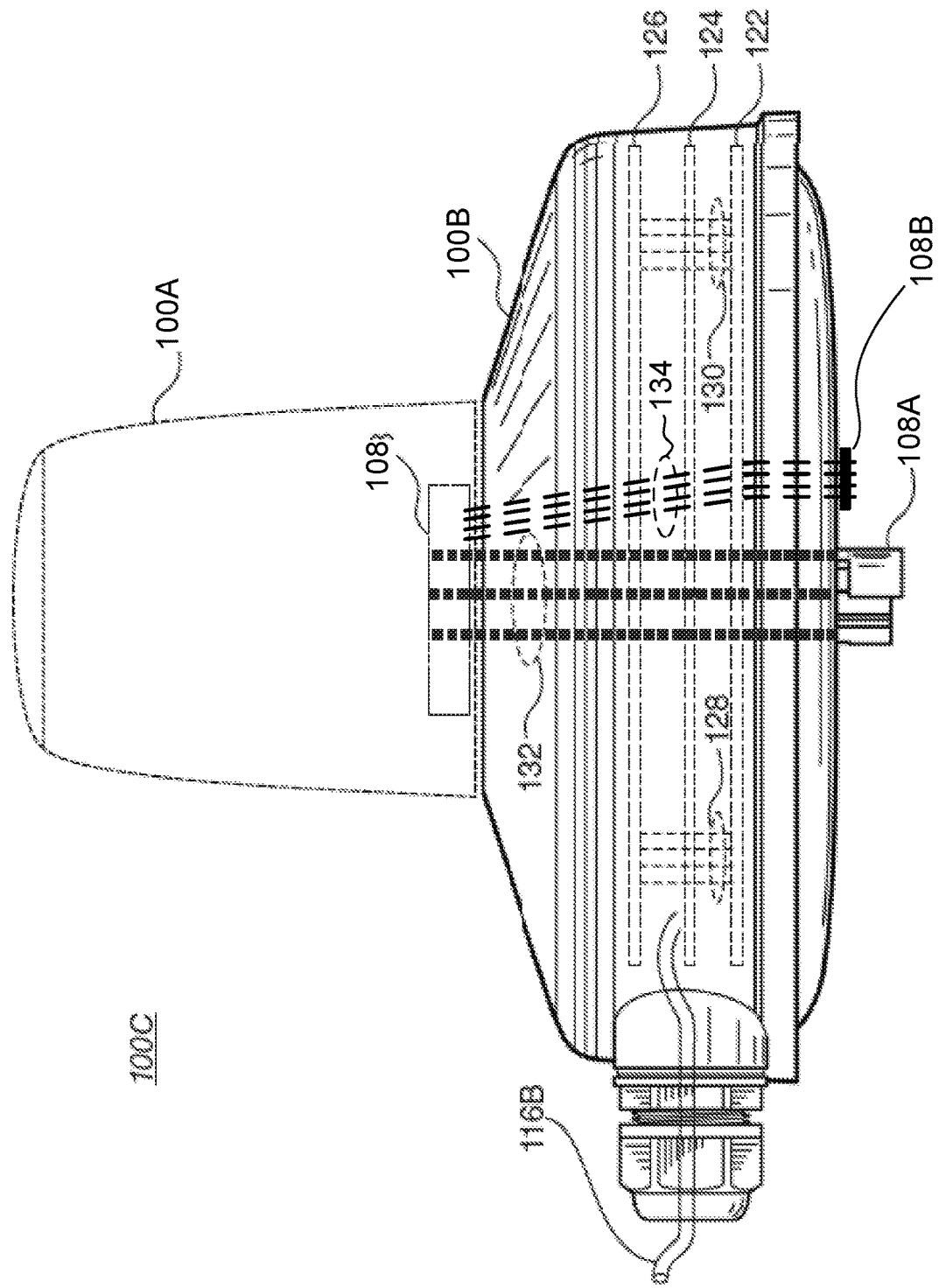
FIG. 6 is a cut-out view of the third aerial control fixture embodiment of FIGS. 5A-5B.

FIG. 6 is a cut-out view of the third aerial control fixture 100C embodiment of FIG. 5. In the embodiment of FIG. 6, the enhanced interface (EI) connector 108 at that bottom of the device is arranged having a primary connector portion 108A arranged as a multi-pin NEMA receiver and a secondary connector portion 108B arranged as a protruding controller-side data connector.

In FIG. 6, the aerial control fixture 100A embodiment arranged as a smart sensor device is shown as an optional structure. In addition, to facilitate an understanding of the present disclosure, a particular portion of the aerial control fixture 100B embodiment arranged as a small cell is also identified.

Three levels of processing circuitry are shown in the aerial control fixture 100C embodiment of FIG. 6, which include a first processing circuit board 122, a second processing circuit board 124, and a third processing circuit board 126. In other aerial control fixture embodiments, more or fewer processing circuit boards are present. In these and other networking device embodiments contemplated, circuit boards are horizontally mounted, vertically mounted, substantially circular, substantially square, or having other shapes, sizes, and configurations. In some cases, circuit boards or other structures in the aerial control fixture 100C embodiment are positively keyed or formed with any number of registration structures to facilitate assembly.

The first, second, and third processing circuit boards 122-126 are formed as modular units. In some cases, the modular layout provides utilitarian benefits related to heat generation, heat dissipation, circuit re-use, radio wave interference reduction, easier or otherwise more efficient manufacturing processes, opportunities to provide combine more or fewer features within an aerial control fixture, and the like. Accordingly, the modular structure of the aerial control fixture 100C embodiment is more than simply design choice. Instead, several of the modular features described in the present disclosure have been invented to solve specific problems and provide desirable benefits.

The first, second, and third processing circuit boards 122-126 are mechanically, electrically, or electromechanically coupled. A first coupling structure 128 couples the three circuit boards according to a power bus, and a second coupling structure 130 couples the three circuit boards according to a data bus, and in the embodiment of FIG. 6. A third coupling structure 132 optionally couples multiple conduits of the primary connector portion 108A through the first, second, and third processing circuit boards 122-126 to corresponding conduits of the primary connector portion 108C. A fourth coupling structure 134 optionally couples multiple conduits of the secondary connector portion 108B through the first, second, and third processing circuit boards 122-126 to corresponding conduits of the secondary connector portion 108D. The coupling structures may include wires or other types of electrical conduits. The coupling structures may also include pins, receptacles, housings, standoffs, bushings, contacts, and other suitable electrical, mechanical, or electromechanical structures.

In at least one embodiment, the first processing circuit board 122 is referred to as a power board. The first processing board may include a first interface to the primary connector portion 108A, which provides a first pin, a second pin, and a third pin. In at least some cases, the first pin is wired to provide a common/neutral/ground contact, the second pin is wired to provide a power/line voltage contact, and the third pin is wired to provide a load contact. In at least some cases, a 260 VAC powerline source is coupled to the three corresponding contacts in a multi-pin NEMA receiver integrated with a light fixture 110. Via this receiver, AC line source power is brought into the aerial control fixture 100C embodiment. Other arrangements of power signals, voltages, and other characteristics as described herein are contemplated.

Figure 7:
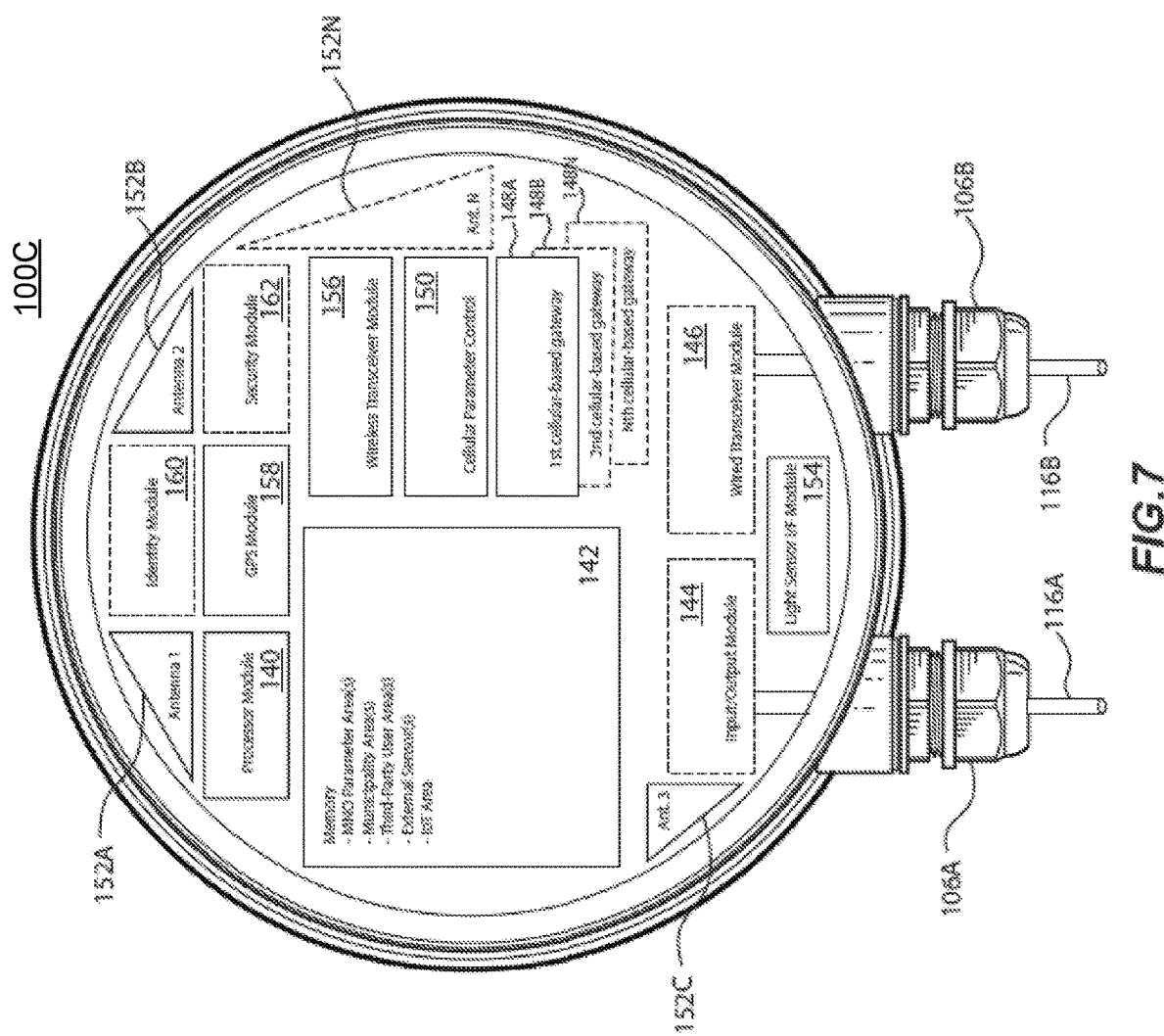
FIG. 7 is an aerial control fixture block diagram embodiment.

FIG. 7 is an aerial control fixture 100C block diagram embodiment. In the embodiment, a processor module 140 includes an applications processor as well as other peripheral circuitry for the processor such as power circuitry, clock circuitry, memory control circuitry, and the like. The processor module 140 is communicatively coupled to a memory module 142. The memory module 142 includes memory of one or more types, which may be desirably partitioned into small cell networking device owner areas, one or more MNO areas, one or more municipality areas, one or more third-party areas, global areas, executable code areas, parameter areas, system areas, sensor areas, IoT areas, secure areas, unlicensed communication areas, licensed communication areas, and other areas as selected or otherwise implemented by one or more computing professionals.

The aerial control fixture 100C embodiment includes one or more optional input/output modules 144 and one or more optional wired transceiver modules 146. The embodiment of FIG. 7 illustrates first cable 116A electromechanically coupled to an input/output module 144 and second cable 116B electromechanically coupled to wired transceiver module 146, but other embodiments are not so limited. As discussed herein, the modular design of the aerial control fixture 100C embodiment permits any desirable arrangement of cables through the twist lock connectors 106A, 106B coupled to pass power, communications, control signals, or other information into, out from, or into and out from the aerial control fixture 100C embodiment. In other cases, the twist lock connectors 106A, 106B are optionally omitted, and any signals that might otherwise pass through first cable 116A and second cable 1166 are instead passed through the EI connector 108.

The aerial control fixture 100C embodiment includes at least one cellular-based gateway 148A, which is a networking module arranged as a gateway to a cellular-based network. The cellular-based network is controlled by a mobile network operator (MNO). The cellular-based gateway 148A enables functionality for a mobile device in proximity to the aerial control fixture 100C embodiment to conduct a wireless communication session using the cellular-based network controlled by the MNO. The wireless communication session may be a cellular phone call, a short message service (e.g., text) message, an electronic mail, an internet session (e.g., delivery of multimedia information through a browser or other client software application on the mobile device), a tracking message, or any other type of communication that passes data over the MNO-controlled cellular-based network.

Optionally, the aerial control fixture 100C embodiment includes a second cellular-based gateway 148B, third cellular-based gateway, and any number of other cellular-based gateways 148N. By inclusion of multiple cellular-based gateways, the aerial control fixture 100C embodiment enables a plurality of concurrent wireless communication sessions via the same or different MNO-controlled cellular-based networks.

Wireless communication sessions that are enabled through one or more cellular-based gateways 148A-148N may pass packetized data through one or more networking structures of the aerial control fixture 100C embodiment. In many cases, packetized data wirelessly received on the cellular-based network from at least one mobile device is communicated on or otherwise through a public switched telephone network (PSTN). The packetized data may be further communicated between the aerial control fixture 100C embodiment and the PSTN in one or more ways, such as via the secondary connector portion of EI connector 108. In some embodiments, the packetized data is passed through the same or another cellular-based gateway 148A-148N to a cellular macrocell, to a landline, or to another aerial control fixture 100C embodiment. In some embodiments, the packetized data is passed through a wired transceiver module 146 (e.g., PoE, digital subscriber line (DSL), broadband cable, or the like) and a cable (e.g., EI connector 108, cables 116A, 116B, or the like) to another computing device. In some embodiments, the packetized data is passed through a different cabled transceiver and cable 116A, 116B, 108 such as a fiber optic transceiver and cable medium. In still other cases, the packetized data is passed through a wireless transceiver module 150, which may be a WiFi (e.g., IEEE 802.11) transceiver or a different type of wireless transceiver (e.g., licensed RF, unlicensed RF, satellite) that communicates according to a different protocol (e.g., a proprietary protocol, a satellite protocol, or some other protocol).

Operations of the one or more cellular-based gateways 148A-148N may be directed by a cellular-based parameter control module 150. In some cases, the cellular-based parameter control module 150 includes features that enable an aerial control fixture 100C embodiment systems integrator or some other party to provision the aerial control fixture 100C embodiment on a cellular-based network of a selected MNO. In this way, the MNO can itself provision each aerial control fixture 100C embodiment for operates on the cellular-based network it controls, or the MNO can authorized another entity to provision the aerial control fixture 100C embodiment. The feature set provided by the cellular-based parameter control module 150 promote efficiency, cost-effectiveness, rapid-deployment, temporary deployment, one or more revenue models, and many other benefits.

The aerial control fixture 100C embodiment includes a plurality of antennas to enable the wireless features of the device. Four antennas are represented in FIG. 7, which include a first antenna 152A, a second antenna 152B, a third antenna 152C, and an Nth antenna 152N. Each antenna may be physically formed, arranged, positioned, and oriented to advantageously provide favorable communication of data. In some cases, one or more antennas are arranged to communicate data on a cellular-based network. In some cases, one or more antennas provide signal-sniffing capabilities. In some cases, one or more antennas are arranged to wirelessly communicate data on a non-cellular, licensed or unlicensed frequency or frequency spectrum as the case may be. In some cases the radial design of the casted small cell cover will be used to enhance antenna performance.

A light sensor interface module 154 is included in the aerial control fixture 100C embodiment. The light sensor interface module 154 may include or otherwise enable light sensor functionality for one or more light sources such as a streetlight arranged in a light fixture that the aerial control fixture 100C embodiment is coupled to. In some cases, the light sensor interface module 154 communicates with a light sensor module 104 (FIG. 3, FIG. 5). In other cases, a light sensor module 104 is integrated with the light sensor interface module 154. The processor of processor module 140 may direct the operations of a light source based on data generated or otherwise provided by the light sensor interface module 154. For example, when ambient light in proximity to the aerial control fixture 100C embodiment reaches one or more lower threshold, the light source may be directed to turn on or otherwise increase its light output. Conversely, when the ambient light in proximity to the aerial control fixture 100C embodiment reaches one or more upper thresholds, the light source may be directed to turn on or otherwise decrease its light output. In some cases, the processor intelligently directs the operation of an associated light source based on information received from any of the available transceivers. In this way, for example, when a first light source from a nearby light pole is undesirably reduced in intensity, a second light source in close proximity may be directed to increase its intensity. As another example, a municipality, law enforcement agency, third-party private entity, or some other entity may intelligently control light output from a plurality of light sources. The intelligent light control of a plurality of light sources may be used for safety, advertising, celebration, crowd control, or any number of other reasons. In at least one embodiment, the aerial control fixture 100C embodiment wireless communicates its light sensor data to another smart device. In this embodiment or other embodiments, the aerial control fixture 100C embodiment wirelessly receives light sensor data from one or more other smart devices.

The wireless transceiver module 156 may provide wireless communication capability to any one or more devices having corresponding wireless transceivers. In some cases, for example, using functionality provided by the wireless transceiver module 156, the aerial control fixture 100C embodiment is arranged to operate as a WiFi access point. In this way, the aerial control fixture 100C embodiment permits one or more mobile devices to access the internet. Municipalities or other entities may make internet services available over a determined geographic area (e.g., a neighborhood, a city, an arena, a construction site, a campus, or the like) to remote mobile devices that are in proximity to any one of a plurality of aerial control fixture 100C embodiment. For example, if many street light fixtures in a neighborhood or city are equipped with an aerial control fixture 100C embodiment, then WiFi service can be provided to a large number of users. What's more, based on seamless communication between a plurality of aerial control fixture 100C embodiments, the WiFi service can be configured as a mesh that permits users to perceive constant internet connectivity even when the mobile device is in motion.

A location module 158 (e.g., global positioning system (GPS), global navigation satellite system (GLONASS), BeiDou navigation satellite system, or some other location determination system) is arranged in the aerial control fixture 100C embodiment. The location module 158 permits the aerial control fixture 100C embodiment to accurately report its position to another computing device. In some cases, the position may be used to positively identify the particular aerial control fixture 100C embodiment. In some cases, the position may be used to expressly direct service personnel to the site where the aerial control fixture 100C embodiment is installed. The position information can be used diagnostically when a light source is failing, when an IoT device or some other sensor reports any type of information, and for other reasons. The highly accurate time-base of the location module 158 may also be used by the aerial control fixture 100C embodiment for weather data, almanac data, signal triangulation with other aerial control fixture 100C embodiments, or for other purposes.

In some cases, an optional identity module 160 is arranged in the aerial control fixture 100C embodiment. The identity module 160 may include electronic, mechanical, or electromechanical switch circuitry, memory, a random number, a random number generator, a system-wide unique identifier, a world-wide unique identifier, or other such information. When combined with position information from the location module 158, the aerial control fixture 100C embodiment may be able to more accurately report its identity and position to another computing device. The identity information can be used diagnostically and for other reasons. In at least some cases, identity information provided by an identity module is used as a network identifier for the aerial control fixture 100C embodiment. The identity information may be arranged as a 32-bit number, a 64-bit number, another number having a structurally preferable bit-width, a combination of information that further conveys information about the capabilities of the aerial control fixture 100C embodiment (e.g., date of deployment, year of deployment, hardware version number, software version number, geographic location, or other such information).

A security module 162 is also optionally included in some embodiments of an aerial control fixture 100C embodiment. The security module may include one or more of an encryption engine, a decryption engine, a random number generator, a secure memory, a separate processing device, and the like.

Figure 8A:
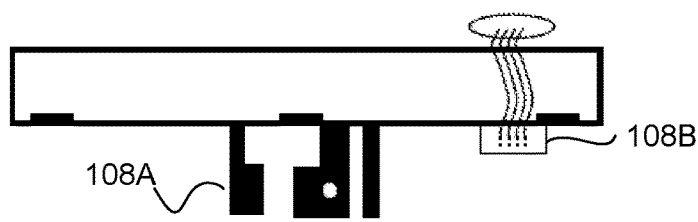
FIGS. 8A-8C are various views of a first enhanced interface (EI) connector embodiment.
Figure 8B:
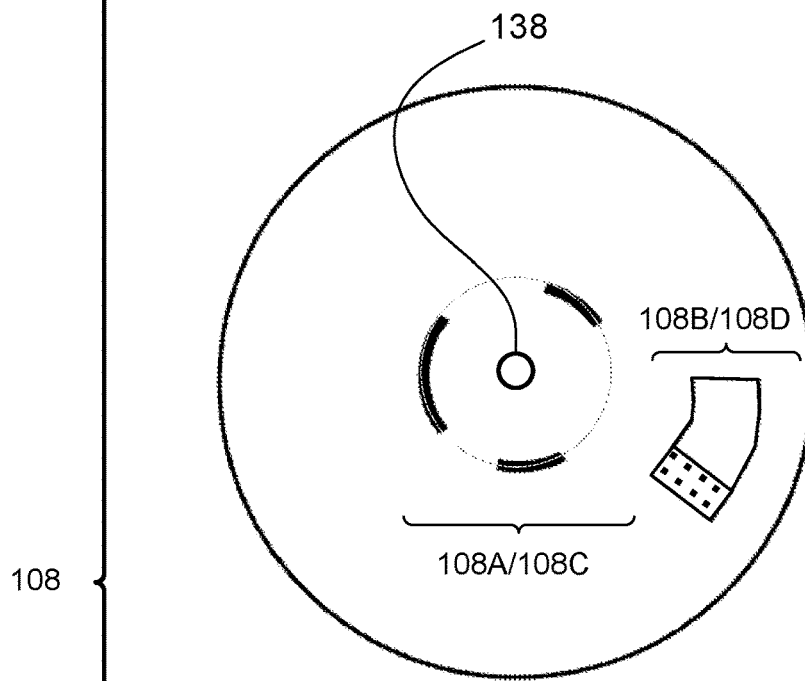
Figure 8C:
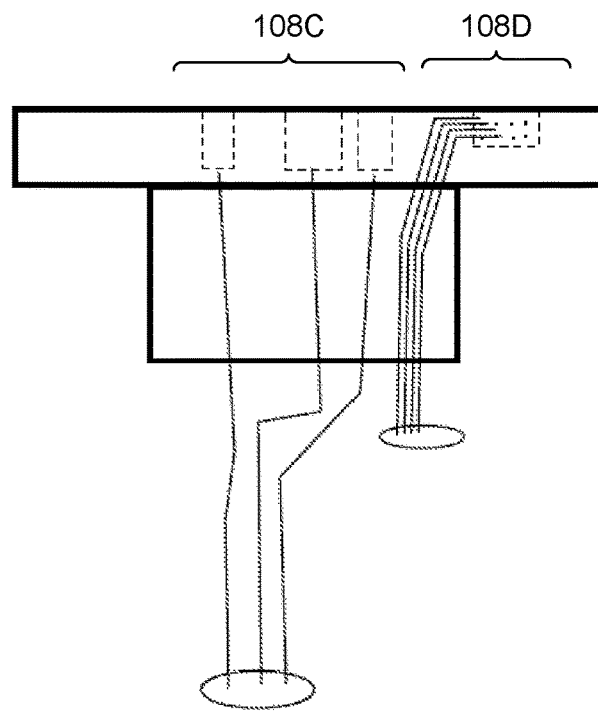

FIGS. 8A-8C are various views of a first enhanced interface (EI) connector embodiment 108. FIGS. 8A-8C may be collectively referred to as FIG. 8. The EI connector 108 of FIG. 8A is described as a connector integrated with a control device such as an aerial control fixture, and the EI connector 108 of FIG. 8C is described as a connector integrated with an aerial fixture device such as an roadway light fixture. It is understood, however, that the embodiments described are not so limited. One or more EI connector devices 108 as described herein may be arranged in any desirable configuration and in any device.

In FIG. 8A, a primary connector portion 108A is arranged as a multi-pin interface integrated with a control device such as an aerial control fixture. A secondary connector portion 108B is arranged as a multi-conduit data interface integrated with the control device. In some cases, the secondary connector portion 108B is arranged as a protruding connector, flush connector, or recessed connector having pins or other suitable connectors.

In some cases, the secondary connector portion 108A includes optical elements such as lenses, prisms, fiber-optic strands, or other such means coupled to light producing elements, light receiving elements, or light producing and light receiving elements. Light producing elements may be arranged as photo diodes, laser diodes, or some other light sources. Light receiving elements may include photo-detectors of any suitable type. In other cases, the secondary connector portion 108A includes RF-coupled elements, electromagnetic-coupled elements, induction-coupled elements, or circuitry that operates according to a different modality. In the embodiments described herein, when an aerial control fixture is rotatably coupled or otherwise electromechanically joined to a corresponding light fixture, a desired datapath is formed between the aerial control fixture and the corresponding light fixture. The datapath may be a single conduit or multi-conduit datapath. The datapath may be a high speed datapath arranged to pass packetized or un-packetized data according to any suitable protocol. In FIG. 8C, a primary connector portion 108C is arranged as a multi-receptacle interface integrated with an aerial fixture device such as a roadway light fixture. A secondary connector portion 108D is arranged as a multi-conduit data interface integrated with the light fixture. In some cases, the secondary connector portion 108D is arranged as a recessed connector, a flush connector, or a protruding connector having receptacles, pads, or other suitable contacts.

In some cases, the secondary connector portion 108D includes optical elements such as lenses, prisms, fiber-optic strands, or other such means coupled to light producing elements, light receiving elements, or light producing and light receiving elements. Light producing elements may be arranged as photo diodes, laser diodes, or some other light sources. In other cases, the secondary connector portion 108D includes RF-coupled elements, electromagnetic-coupled elements, induction-coupled elements, or circuitry that operates according to a different modality. In the embodiments described herein, when an aerial control fixture is rotatably coupled or otherwise electromechanically joined to a corresponding light fixture, a desired datapath is formed between the aerial control fixture and the corresponding light fixture. The datapath may be a single conduit or multi-conduit datapath. The datapath may be a high speed datapath arranged to pass packetized or un-packetized data according to any suitable protocol.

The EI connector 108 of FIG. 8B is presented in such a way as to illustrate either a bottom view of the control device of FIG. 8A or a top view of the aerial fixture device of FIG. 8C. Thus, it is shown that in any arrangement, the primary connector portion 108A is arranged to electrically (e.g., communicatively) mate with the primary connector portion 108C, and the secondary connector portion 108B is arranged to electrically (e.g., communicatively) mate with the secondary connector portion 108D. In some cases, primary and secondary connectors are mated when one EI connector 108 is rotatably joined to a corresponding EI connector 108.

In FIG. 8B, an optional central signal structure 138 is also represented. In some embodiments, the central signal structure 138 includes a first portion in the primary connector portion 108A and a second portion in the primary connector portion 108C. The central signal structure 138 may be represented as a conductive post in the primary connector portion 108A, and the central signal structure 138 may be represented as a conductive receptacle in the primary connector portion 108C. The central signal structure 138, in embodiments where it is implemented, may optionally be used to present an earth ground plane to circuitry of the aerial control fixture.

In at least one embodiment, primary connector portion pair 108A, 108C is compliant with a published standard such as a NEMA published standard. Exemplary standards published by NEMA include several hundred technical standards for electrical enclosures, controllers, communication protocols, motors, wire, plugs, and receptacles among other equipment such as those directed toward Roadway and Area Lighting Equipment and referred to as ANSI C136 standards. At least one NEMA standard, referred to as ANSI C136.41, is directed to external locking type photo-control devices for street and area lighting. In at least one of these embodiments, the secondary connector portion pair 108B, 108D includes a four (4) to twelve (12) pin configuration arranged to pass high speed data. In this and in similar embodiments, the secondary connector 108B is arranged as a male connector having pins, protruding contacts (e.g., spring contacts, leaf-spring contacts, or the like), or some other prominent contacts and the secondary connector 108D is arranged as a corresponding female connector.

In some embodiments, the secondary connector portion pair 108B, 108D are arranged with features that contribute to the mechanical coupling of aerial fixture devices. For example, in some cases, the secondary connector portion pair 108B, 108D include a protruding portion and a recessed portion wherein the protruding portion securely mates with the recessed portion. In other embodiments, pins of a first secondary connector portion frictionally mate with corresponding sockets of a second secondary connector portion.

Figure 9:
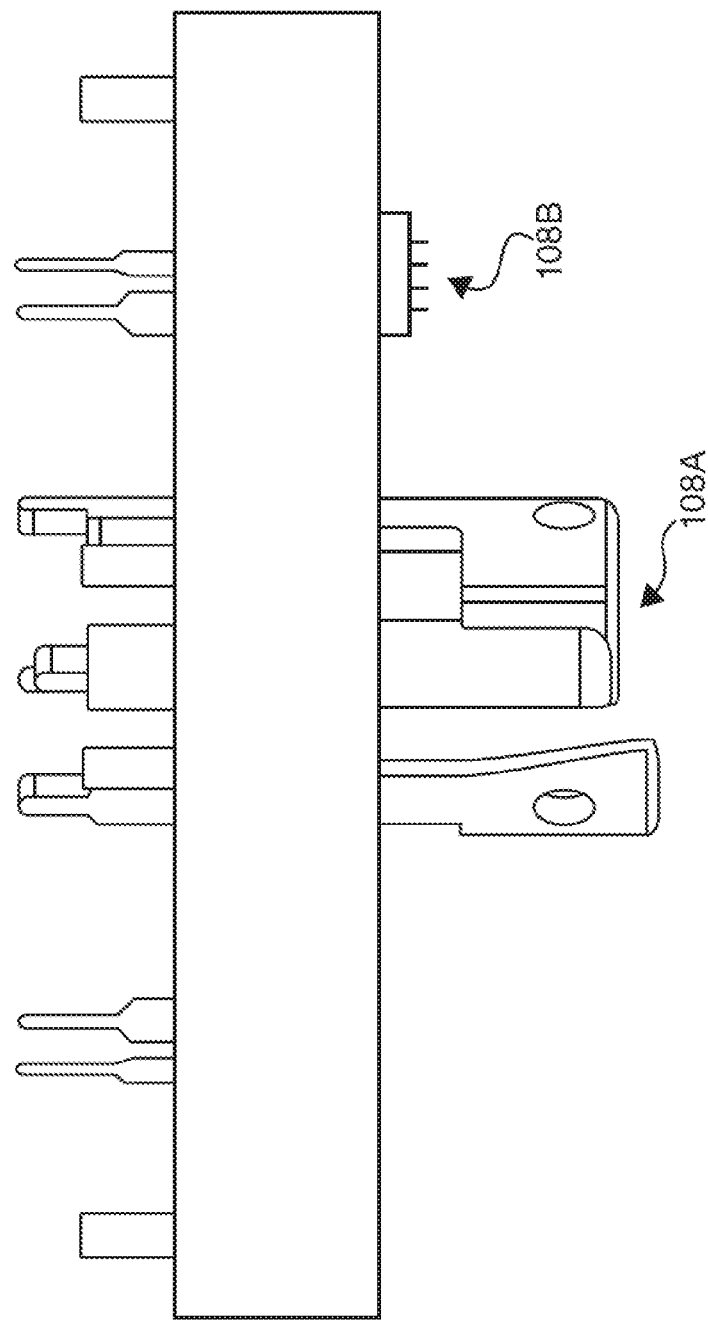
FIG. 9 is a second enhanced interface (EI) connector embodiment.

FIG. 9 is a second enhanced interface (EI) connector embodiment. The EI connector of FIG. 9 may be integrated into any of the aerial control fixture embodiments described in the present disclosure or in other types of equipment. One embodiment of a primary connector portion 108A and one embodiment of a secondary connector portion 108B are represented.

Figure 10A:
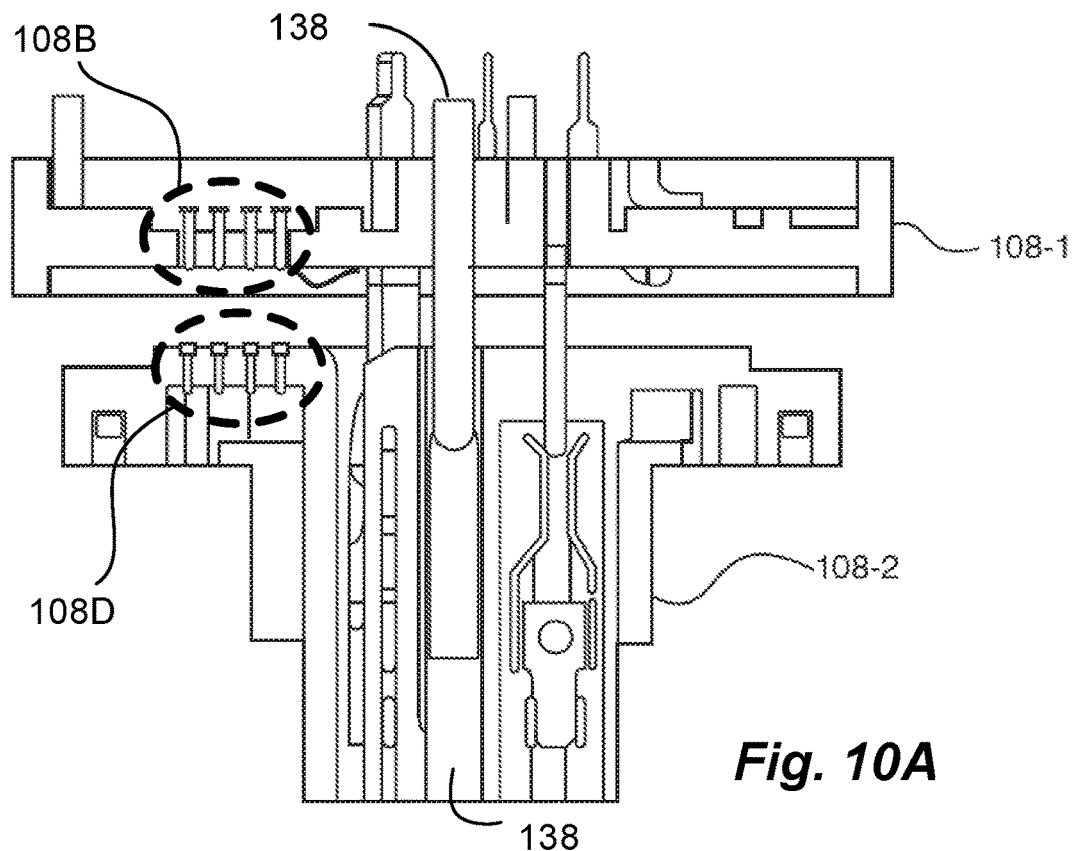
FIGS. 10A-10B are a cross-sectional view of an enhanced interface (EI) connector embodiment showing partial and full coupling of the controller-side EI connector to the fixture-side EI connector.
Figure 10B:
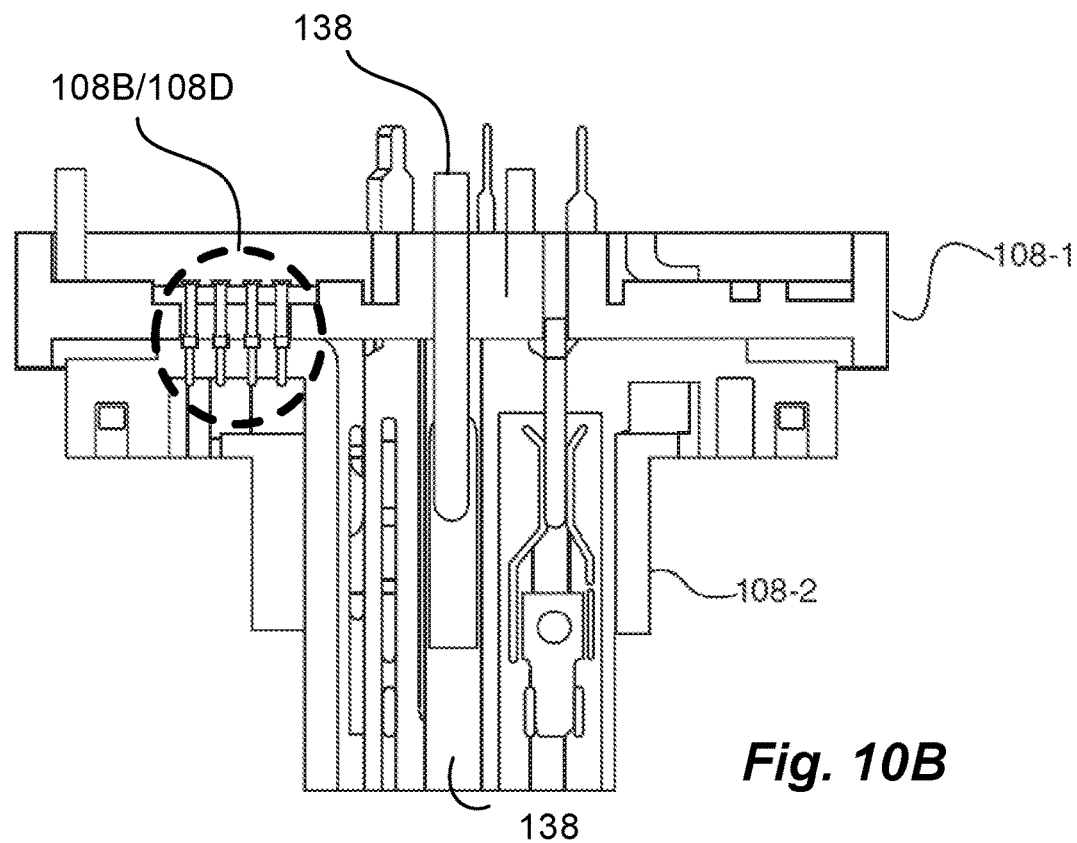

FIGS. 10A-10B are a cross-sectional view of an enhanced interface (EI) connector embodiment showing partial and full coupling of the controller-side EI connector to the fixture-side EI connector. FIGS. 10A-10B may be collectively referred to as FIG. 10. In FIG. 10A, a first enhanced interface (EI) connector 108-1 is partially coupled to a second EI connector 108-2. In the embodiment, the secondary connector portion 108B (FIG. 8) of the first EI connector 108-1 is approaching the secondary connector portion 108D (FIG. 8) of the second EI connector 108-2. In this embodiment, the secondary connector portions 108B, 108D are rotatably coupled electromechanical pins, but in other embodiments, many other wired and wireless coupling structures are contemplated. In FIG. 10B, the first EI connector 108-1 is fully coupled to the second EI connector 108-2. In the connector positions of FIG. 10A, the primary connector portion 108A is electrically coupled to the primary connector portion 108C before the secondary connector portions 108B, 108D are electrically coupled. Four individual conduits of the secondary connector 108 are represented in FIG. 10, however it is understood that any suitable number of wired or wireless conduits (e.g., between one and one hundred or more) may be arranged. The conduits may include any medium suitable to pass data signals at a selected data rate. Exemplary communication mediums include, but are not limited to, electrically conductive mediums (e.g., copper, gold), optical mediums, electromagnetic mediums, and RF mediums.

Figure 11A:
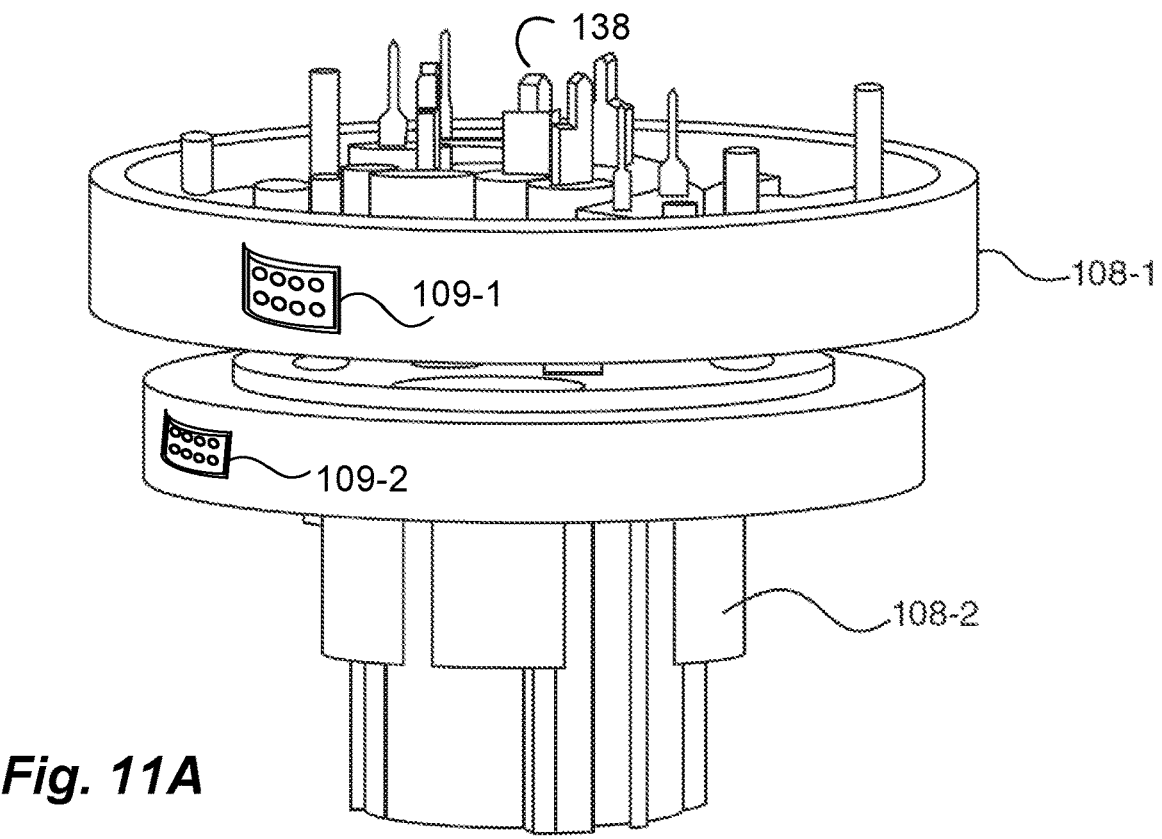
FIGS. 11A-11B are a perspective view of an enhanced interface (EI) connector embodiment showing partial and full coupling of the controller-side EI connector to the fixture-side EI connector.
Figure 11B:
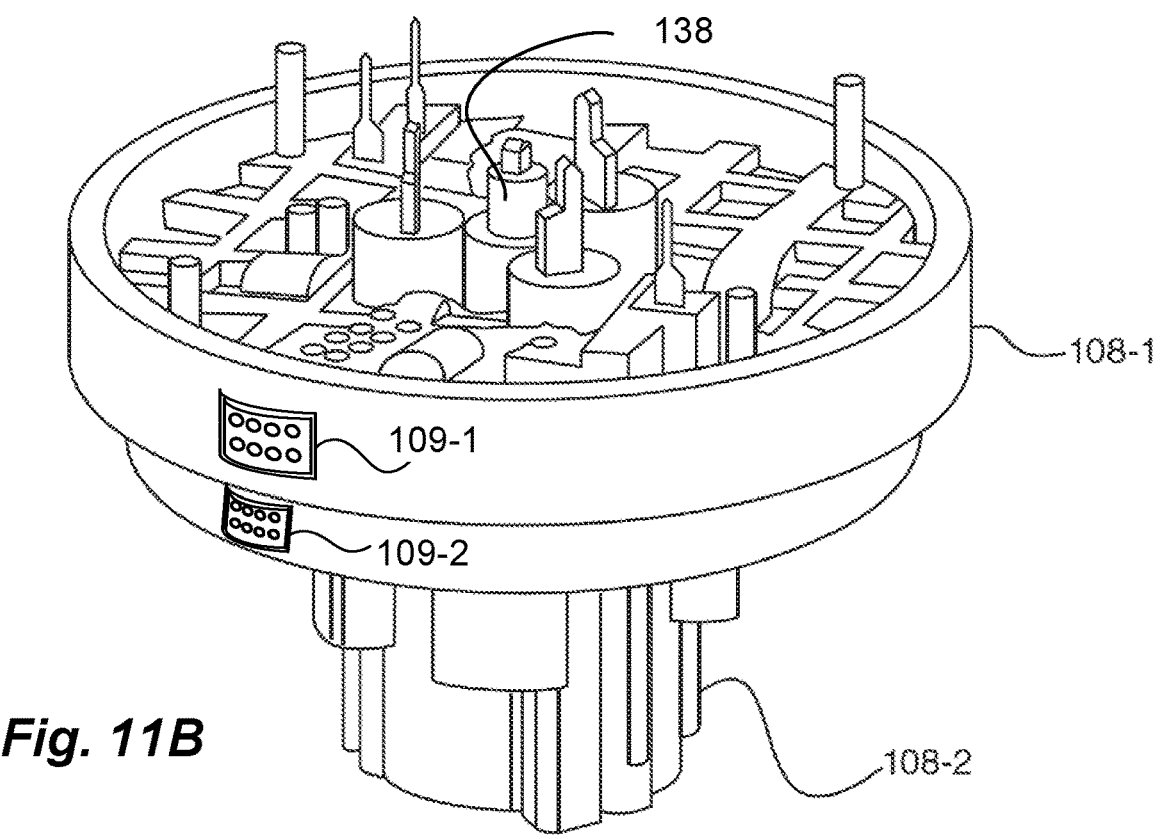

FIGS. 11A-11B are a perspective view of an enhanced interface (EI) connector embodiment showing partial and full coupling of the controller-side EI connector to the fixture-side EI connector. FIGS. 11A-11B may be collectively referred to as FIG. 11. In FIG. 11A, a first enhanced interface (EI) connector 108-1 is partially coupled to a second EI connector 108-2. In FIG. 10B, the first EI connector 108-1 is fully coupled to the second EI connector 108-2.

In the embodiments of FIGS. 11A-11B, one or more optional sidewall connectors 109-1, 109-2 may be integrated into the external wall of the first and second EI connectors 108-1, 108-2, respectively. In these embodiments, power signals (e.g., utility power from the power line 206 (FIG. 1), device power from an aerial control fixture 100, or some other power signal), high speed data connection signals, lower speed data signals, control signals, or some other signals may be ported to one or more of the optional sidewall connectors 109-1, 109-2. The signals may be selectively coupled to any suitable power or signal elements as described in the present disclosure.

In the embodiment of FIG. 11, optional sidewall connectors 109-1, 109-2 are represented in a non-limiting eight pin, dual in-line pin configuration. Any other suitable proprietary or standardized configuration may also be implemented. For example, in some cases sidewall connectors 109-1, 109-2 are implemented as RJ-45 connectors. In other cases, sidewall connectors 109-1, 109-2 may be implemented as pins, receptacles, contacts, or some other types of connectors. In some cases, a first sidewall connector 109-1 has a first configuration, and a second sidewall connector 109-2 has a second, different configuration. In some cases, for each individual connector of a secondary connector 108B, 108D of an enhanced interface (EI) connector, then sidewall connectors 109-1, 109-2 have a corresponding connector. In other cases, the sidewall connectors 109-1, 109-2 have fewer or more individual connectors than secondary connectors 108B, 108D of the same enhanced interface (EI) connector.

In FIG. 11A, sidewall connectors 109-1 and 109-2 are offset with respect to each other before the first enhanced interface (EI) connector 108-1 is rotatably joined to the second EI connector 108-2 in the electromechanical coupling shown in FIG. 11B. When the rotated coupling is completed, the first sidewall connector 109-1 is vertically aligned with the second sidewall connector 109-2. Other orientations of the sidewall connectors 109-1, 109-2, with respect to each other are contemplated. In fact, one or both of the sidewall connectors 109-1, 109-2 may be suitably formed in any portion of the side-wall of their respective EI connector.

Figure 12:
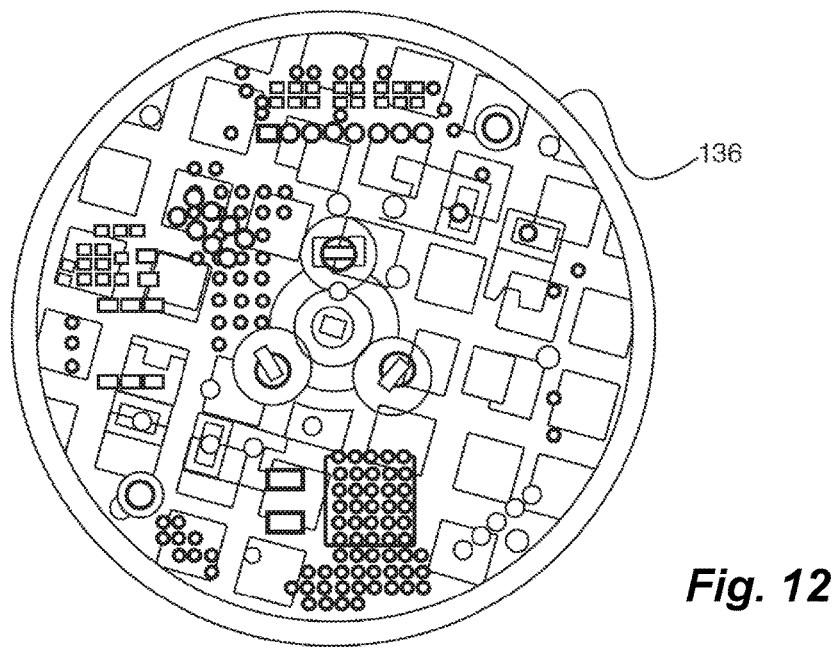
FIG. 12 is an aerial control fixture circuit board embodiment.

FIG. 12 is an aerial control fixture circuit board 136 embodiment. In the embodiment, an 8-contact array is visible. The 8-contact array is arranged for electrical (e.g., communicative) coupling to the secondary connector portion 108B, 108D. Information, control signals, or the like may be passed in to or out from any of the aerial control fixtures described herein.

Figure 13:
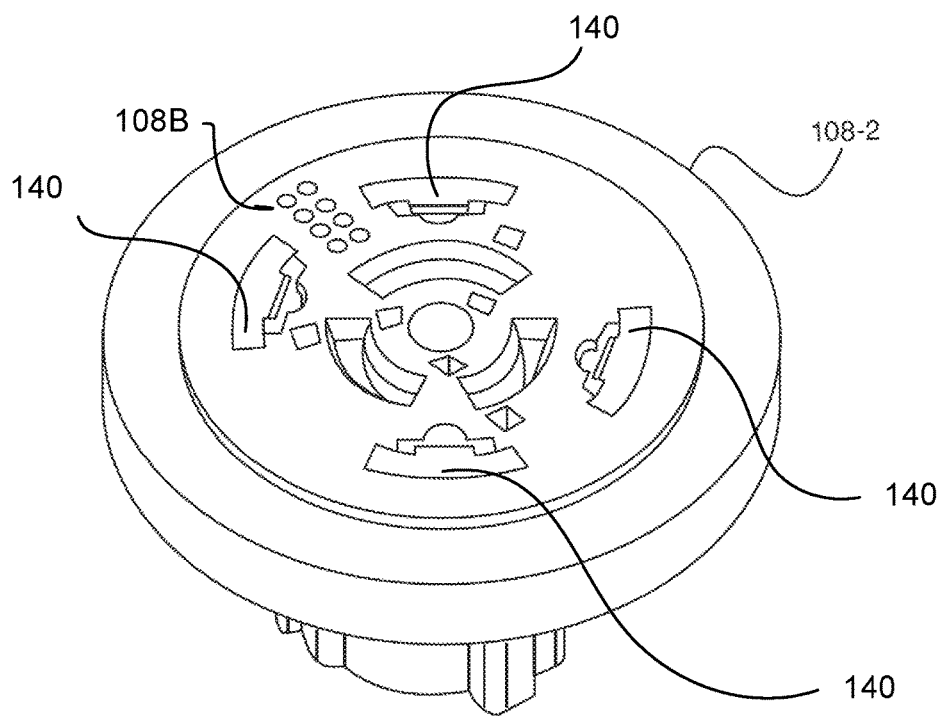
FIG. 13 is an aerial fixture-side enhanced interface (EI) connector embodiment.

FIG. 13 is an aerial fixture-side enhanced interface (EI) connector 108-2 embodiment shown in a perspective view. The embodiment of FIG. 13 is along the lines of those represented in FIGS. 10-11. In the embodiment, an 8-contact array is visible and corresponds to the array represented in the aerial control fixture circuit board 136 embodiment of FIG. 12. In at least one embodiment, the eight contacts comply with known Ethernet signaling conduits (i.e., TX_D1+, TX_D1−, RX_D2+, RX_D2−, BI_D3+, BI_D3−, BI_D4+, BI_D4−). Also represented in FIG. 13 are a set of four dimming contacts 140 (i.e., two channels). The dimming contacts 140 are arranged to present conventional (e.g., 0 VDC to 10 VDC) dimming voltages to a light source in a known way, which cause the light source to vary its luminosity. In many cases, for example, a voltage of 10 VDC applied on the dimming contacts 140 will cause the light source to output 100 percent of its producible light; a voltage of 9 VDC on the dimming contacts will cause the light source to output 90 percent of its producible light; 8 VDC will result in 80 percent producible light, and so on. Accordingly, the dimming contacts 140 do not pass any data signals. In some embodiments, the dimming contacts provide dimming control voltages produced by the processor module 140 (FIG. 7).

Figure 14A:
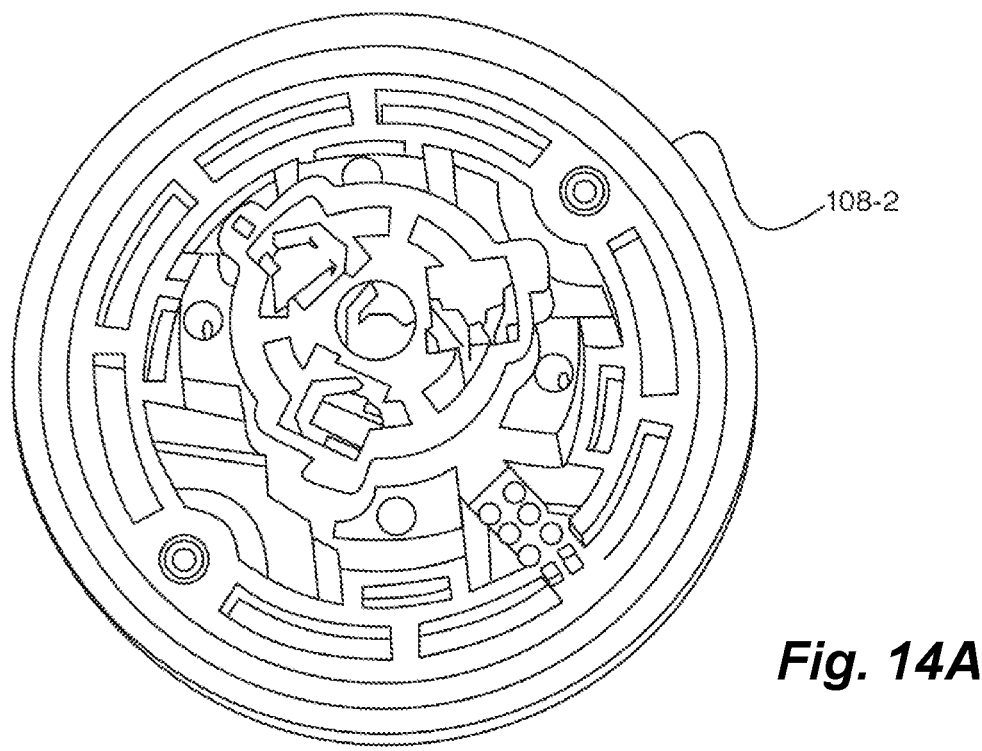
FIG. 14A is another aerial fixture-side enhanced interface (EI) connector embodiment.
Figure 14B:
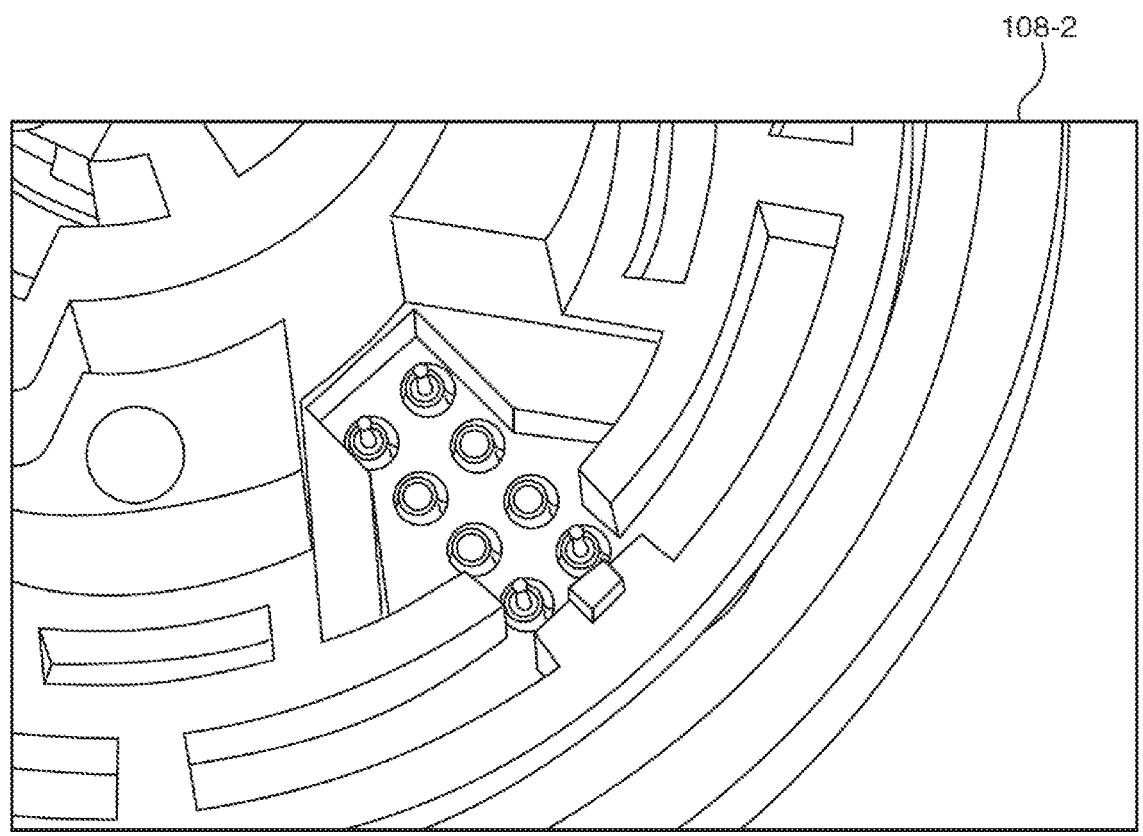
FIG. 14B is a close-up view of the high speed data connector portion of the enhanced interface (EI) connector in the aerial fixture-side embodiment of FIG. 14A.

FIG. 14A is another aerial fixture-side enhanced interface (EI) connector embodiment 108-2, and FIG. 14B is a close-up view of the high speed data connector portion 108D of the enhanced interface (EI) connector 108-2 in the aerial fixture-side embodiment of FIG. 14A. FIGS. 14A-14B may be collectively referred to as FIG. 14.

FIGS. 15A-15F are another embodiment of the aerial control fixture arrangements described in the present disclosure. FIGS. 15A-15F may be collectively referred to as FIG. 15. Additional optional embodiments of an enhanced interface (EI) connector 108 with certain optional features are shown in FIG. 15 and discussed in more detail.

Figure 15A:
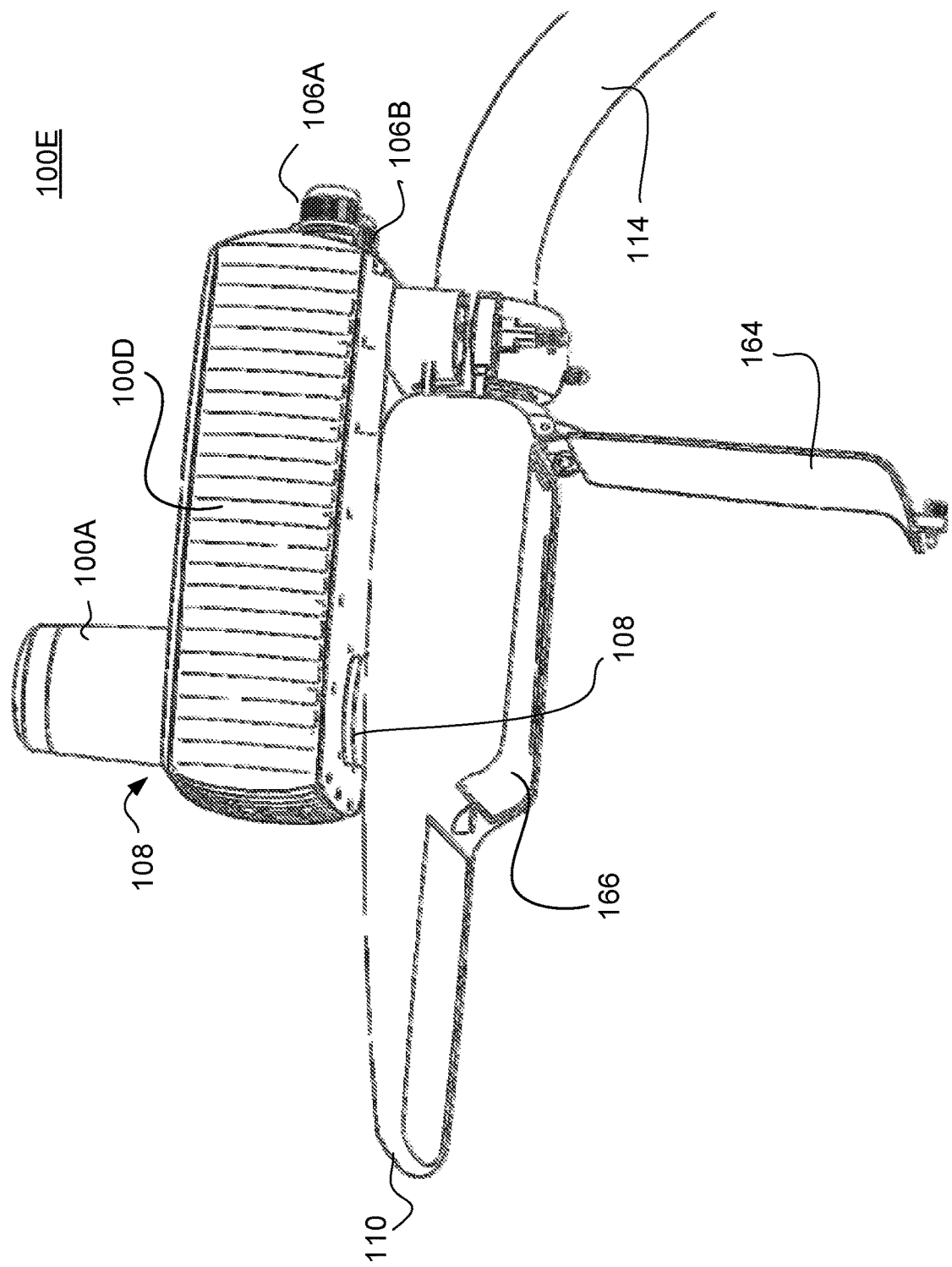
FIG. 15A is an exemplary embodiment of a certain aerial control fixture arranged with a light, which itself is coupled to a light pole.

FIG. 15A is an exemplary embodiment of a certain aerial control fixture 110E arranged with a light fixture 110, which itself is coupled to a light pole 114. The aerial control fixture 110E of FIG. 15A includes a first aerial control fixture 100A arranged as a smart sensor device and a second aerial control fixture 100D arranged as a small cell or other wireless networking device. One or the other of the first aerial control fixture 100A and the second aerial control fixture 100D is optional. The second aerial control fixture 100D may be arranged along the lines of the aerial control fixtures 100B, 100C (FIGS. 4-7). In still other embodiments, the aerial control fixture 110E may be coupled to a platform (i.e., structure) other than a light fixture 110 (e.g., a building, a sign, or any other suitable structure) without departing from the teaching of the present disclosure.

In the embodiment of FIG. 15A, the first aerial control fixture 100A is electromechanically coupled to the second aerial control fixture 100D via an enhanced interface (EI) connector 108 (identified, but not shown). Also in the embodiment of FIG. 15A, the second aerial control fixture 100D is electromechanically coupled to the light fixture 110 via an enhanced interface (EI) connector 108. One or both of the EI connectors 108 of FIG. 15A are formed along the lines of the EI connectors 108 of FIGS. 8-14. Additional optional features of the enhanced interface (EI) connector 108 are shown and discussed with respect to FIG. 15.

The second aerial control fixture 100D in FIG. 15A may optionally include or exclude one or both the twist lock connectors 106A, 106B.

The light fixture 110 in FIG. 15 includes an access door 164, which, when opened, reveals an access compartment 166. The access door 164 and access compartment 166 are non-limiting embodiments of the light fixture 110. One of skill in the art will recognize that many other types of light fixtures with a nearly unlimited range form factors are available. Along these lines, any number of compartments may have any number of sizes and shapes, and such compartments may have any suitable means of access.

Figure 15B:
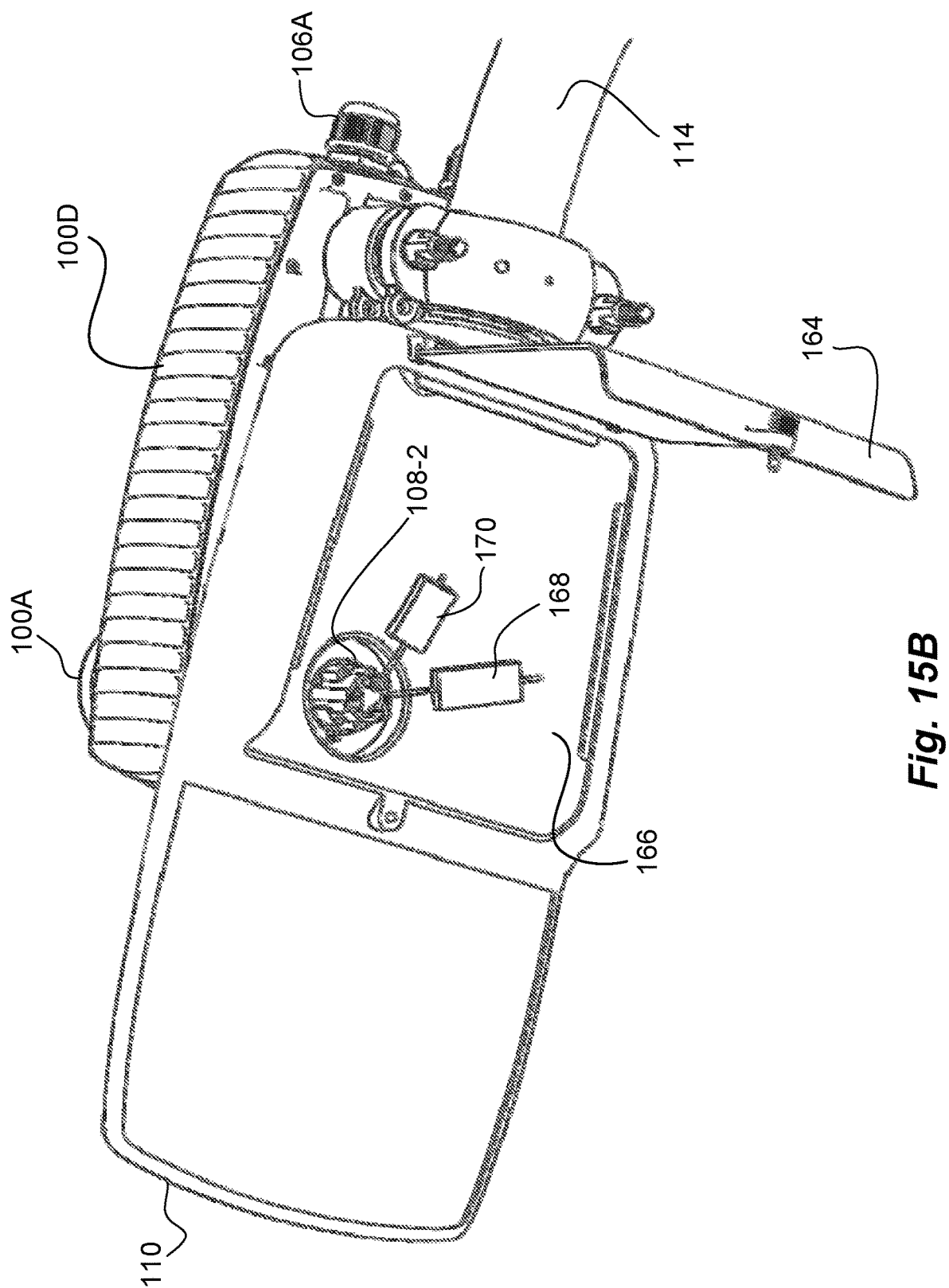
FIG. 15B is the aerial control fixture embodiment of FIG. 15A as viewed from below.

FIG. 15B is the aerial control fixture embodiment of FIG. 15A as viewed from below. Elements of the aerial control fixture embodiment having reference numbers in any of FIGS. 15A-15F are consistently identified in others of FIGS. 15A-15F but for simplicity, descriptions of these elements are not repeated in the discussion of each figure.

In the access compartment 166, a socket side (i.e., fixture side) enhanced interface (EI) connector 108-2 (FIGS. 10-14) is exposed. Two modules are coupled to the secondary portion 108D (not visible in FIG. 15B) of the EI connector 108-2. A first module is a power module 168, and a second module is a high speed data conversion module 170. One or both of the power module 168 and the high speed data conversion module 170 are optional.

The power module 168 may in some cases be an interface to pass or otherwise expose one or more low power DC voltage signals. The low power direct current (DC) voltage signal may be, for example, a 2.5 VDC to 50 VDC low voltage DC signal drawn from the aerial control fixture 100D. The low power DC voltage signal may be a variable power signal. In at least some cases, the low power DC voltage signal may be programmatically controlled by a control signal that is generated in the aerial control fixture 100D or otherwise communicated through the aerial control fixture 100D. In still other cases, the low power DC voltage signal may include low power DC dimming control signals. An output of the low power module 168 may be exposed to any suitable device, such as a third party electronic device, that is located in the access compartment 166 or in some other location (e.g., at some other point in or on the light fixture 110, at some point on the light pole 114, in proximity to the light pole 114, or in some other location).

In other embodiments, the power module 168 may draw input power from the utility power source 206 (FIG. 1), which is passed through the light pole 114, into the access compartment 166, and through the EI connector 108. The input power line is not shown in FIG. 15B to avoid obscuring other features of the embodiment. From the input power, the power module 168 may provide an output power that is different from the input power. For example, in some embodiments, the input source to the power module 168 is tapped within the EI connector 180, and the output from the power module 168 is available in the access compartment 166. In other embodiments, the input source to the power module is tapped from the utility power source 206 in the access compartment 166 and the output from the power module is provided to the EI connector 108. In one or more of these cases, the power module 168 may change the input alternating current (AC) utility power from its input voltage (e.g., 120 VAC, 208 VAC, 220 VAC, 240 VAC, 260 VAC, 277 VAC, 360 VAC, 415 VAC, 480 VAC, 600 VAC, or some other power source voltage) to a different output AC voltage (e.g., 120 VAC, 208 VAC, 220 VAC, 240 VAC, 260 VAC, 277 VAC, 360 VAC, 415 VAC, 480 VAC, 600 VAC, or some other power source voltage). In addition, or in the alternative, the power module 168 may change the input AC utility power from its input voltage to a DC output voltage (e.g., 0.5 VDC, 1 VDC, 2.5 VDC, 5 VDC, 6 VDC, 9 VDC, 12 VDC, or some other voltage). In at least some cases, the power module 168 accepts an input AC power and provides a lower power DC voltage that is applied to one or more wireless transceivers coupled to, or integrated within, the enhanced interface (EI) connector 108.

The high speed data conversion module 170 in some embodiments is arranged to form or otherwise communicate streaming digital data, packetized digital data, or some other form of data. That is, in any number of zero or more cases, data in the high speed data conversion module 170 may be accumulated, buffered, serialized, parallelized, packetized, or formatted in any suitable manner.

In at least one embodiment, the input to the high speed data conversion module 170 is coupled to one of a plurality (e.g., one of a pair, one of three, one of many) of RF-coupled or near-field electromagnetic induction-coupled elements. In at least one embodiment, the input to the high speed data conversion module 170 is coupled to one of a plurality (e.g., one of a pair, one of three, one of many) of electromagnetically-coupled (e.g., inductive) elements. As illustrated in FIG. 15B, the input to the high speed data conversion module 170 is coupled to a data communication element 172D.

In at least one embodiment, the output from the high speed data conversion module 170 is coupled to one or more conduits (e.g., a light-based conduit such as a fiber-optic cable, a twisted pair of wire, and the like). The one or more conduits may communicate signals from the light fixture 114. In at least one case, signals communicated from the high speed data conversion module 170 are passed down the light pole 114. The conduit passed out from the light fixture 110 may be coupled to a connector on the light fixture 110. In addition, or in the alternative, the conduit passed out from the light fixture 110 may travel down the light pole 114 to a street cabinet 208 (FIG. 1) or to some other connection device.

Figure 15C:
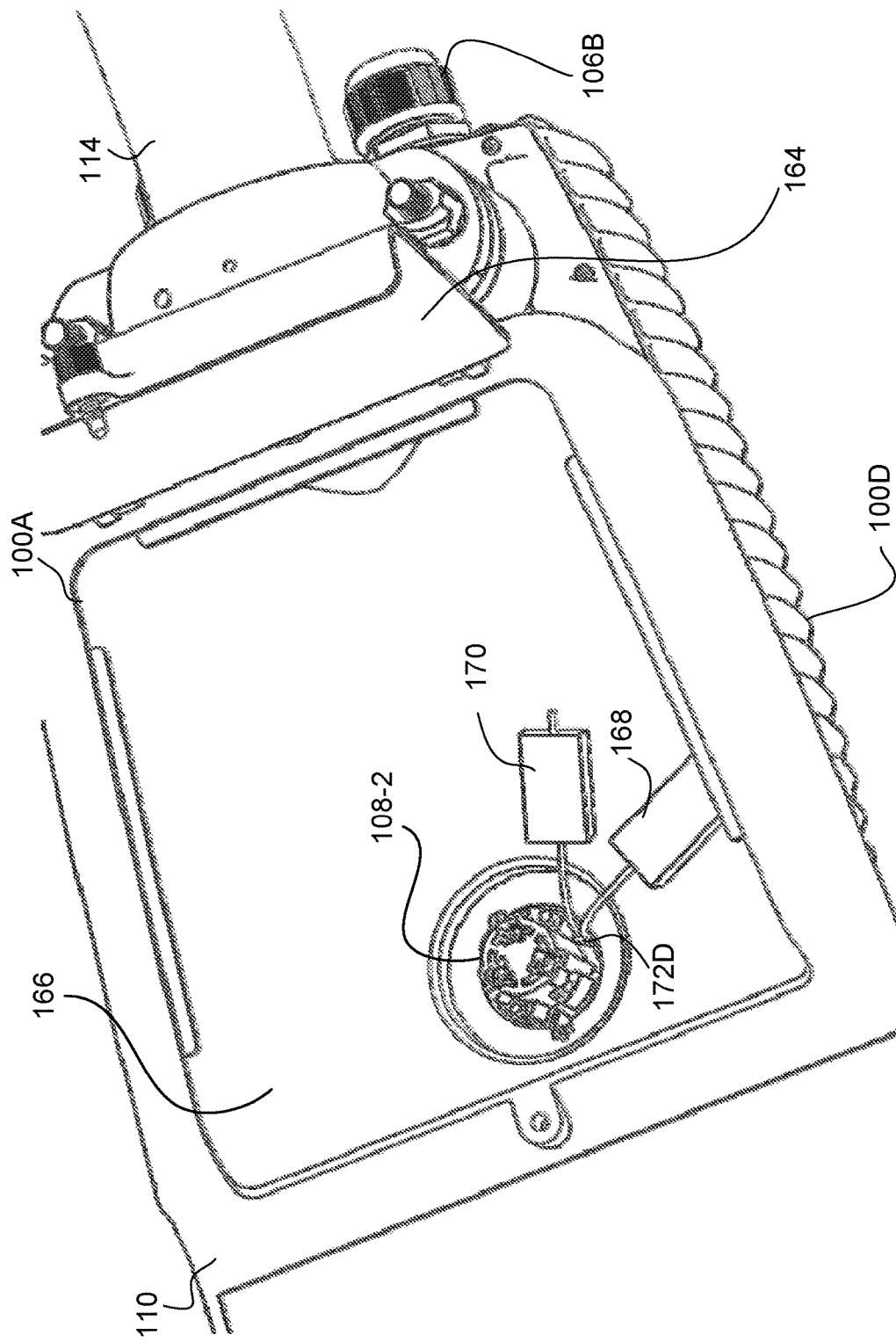
FIG. 15C is the aerial control fixture embodiment of FIG. 15B as viewed from below, in more detail.

FIG. 15C is the aerial control fixture embodiment of FIG. 15B as viewed from below, in more detail.

Figure 15D:
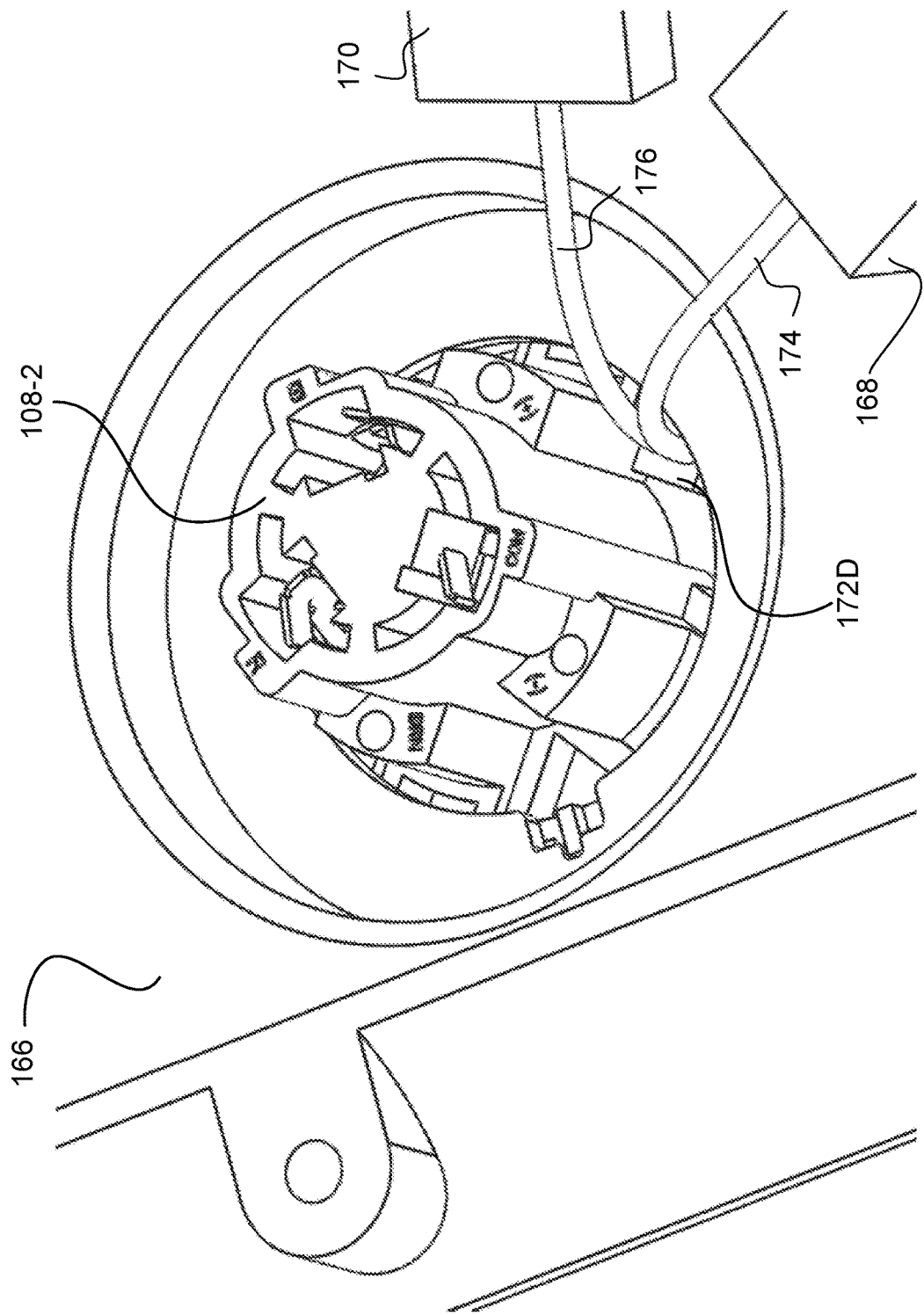
FIG. 15D is one specific embodiment of the aerial control fixture and light fixture assembly as viewed from below and in more detail.

FIG. 15D is one specific embodiment of the aerial control fixture 100D and light fixture 110 assembly as viewed from below and in more detail. In the embodiment of FIG. 15D, the output of the optional power module 168 is coupled to a data communication element 172D via a low voltage conduit 174. The low voltage conduit 174 may, for example, be a light gauge (e.g., 14 ga, 16 ga, 18 ga, or some other gauge) single or multi-conductor conduit arranged to pass power into the data communication element 172D. Also in the embodiment of FIG. 15D, the output of the high speed data conversion module 170 is coupled to the data communication element 172D via a single or multi-conductor high speed data conduit 176 arranged to pass data to, from, or to and from the data communication element 172D.

In at least some cases, the data communication element 172D is a second data communication element. In these cases, the second data communication element 172D corresponds to a first data communication element 172B (FIG. 15F) that is coupled to, or otherwise integrated in, a first enhanced interface (EI) connector 108-1 (FIGS. 8, 10, 11, 15F).

Figure 15E:
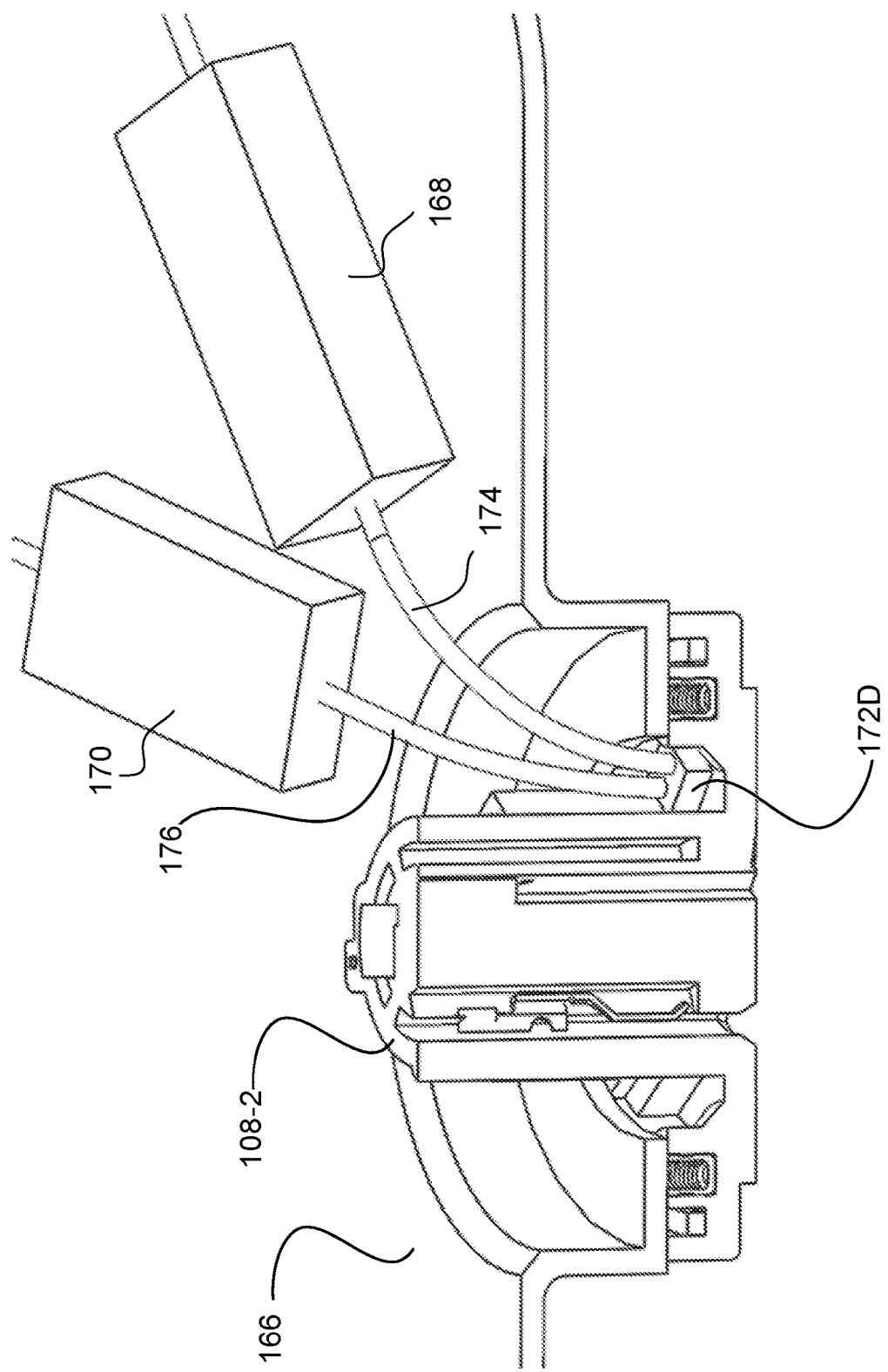
FIG. 15E is an exemplary cross-sectional view of the one specific embodiment of FIG. 15D.

FIG. 15E is an exemplary cross-sectional view of the one specific embodiment of FIG. 15D.

Figure 15F:
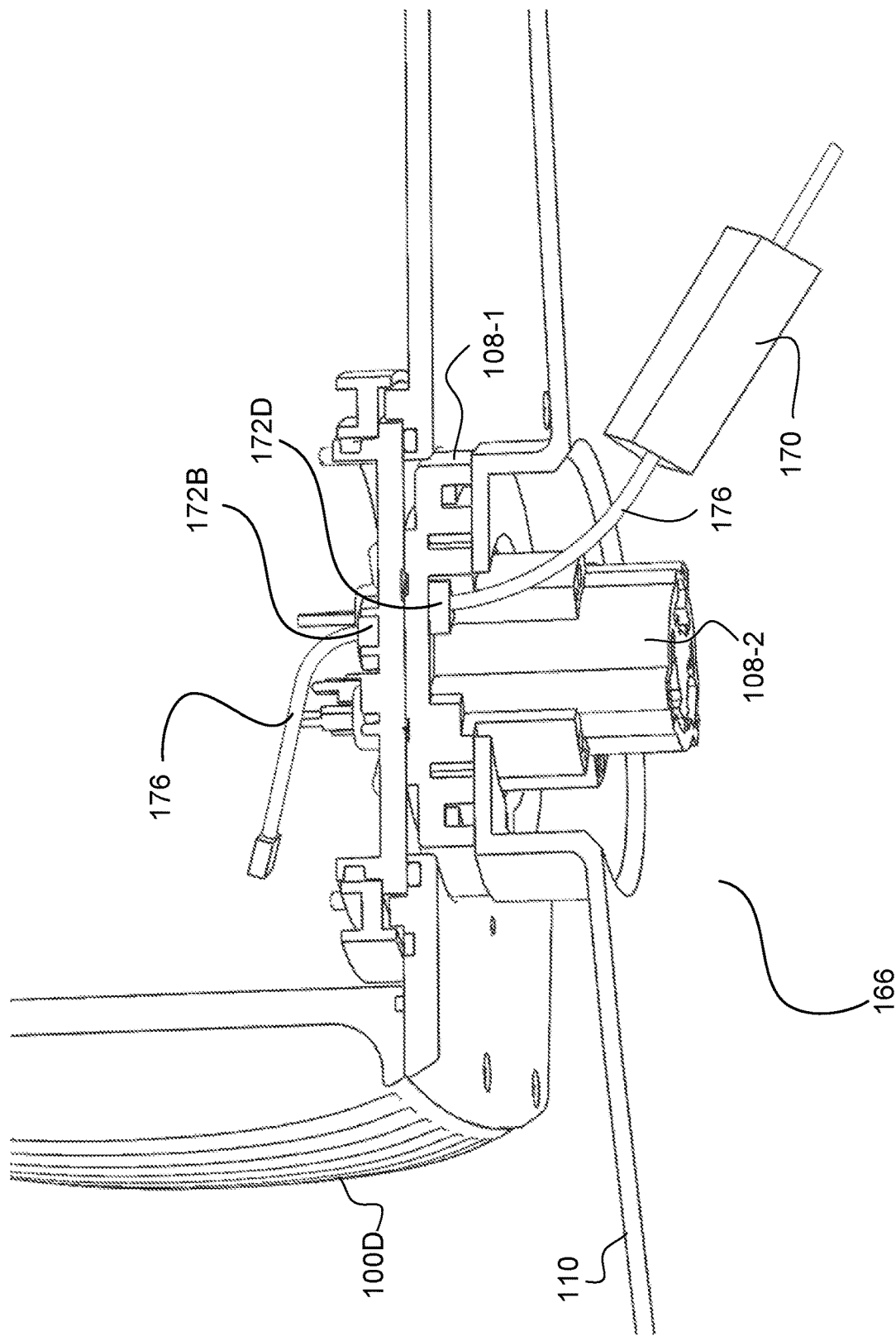
FIG. 15F is a cut-away view of the one specific embodiment of FIG. 15D.

FIG. 15F is a cut-away view of the one specific embodiment of FIG. 15D. In the cut-away view, the interface between the aerial control fixture 100D and the light fixture 110 is illustrated via the first enhanced interface (EI) connector 108-1 being electromechanically coupled to the second enhanced interface (EI) connector 108-2. In the embodiment, the high speed data conversion module 170 is coupled to a second data communication element 172D via a single or multi-conductor high-speed data conduit 176, and the second data communication element 172D is arranged to form a wireless communicative relationship with a first data communication element 172B. Another single or multi-conductor high-speed data conduit 176 couples the first data communication element 172B to at least one of a data source element and a data sink element of the aerial control fixture 100D. The data source element and data sink elements may, for example, be any one or more the processor module 140, input/output modules 144, wired transceiver module 146, cellular gateway 148A-148N, wireless transceiver module 156, location module 158, or any other data providing or data consuming module found in a device such as the aerial control fixtures 100 of the present disclosure.

Figure 16:
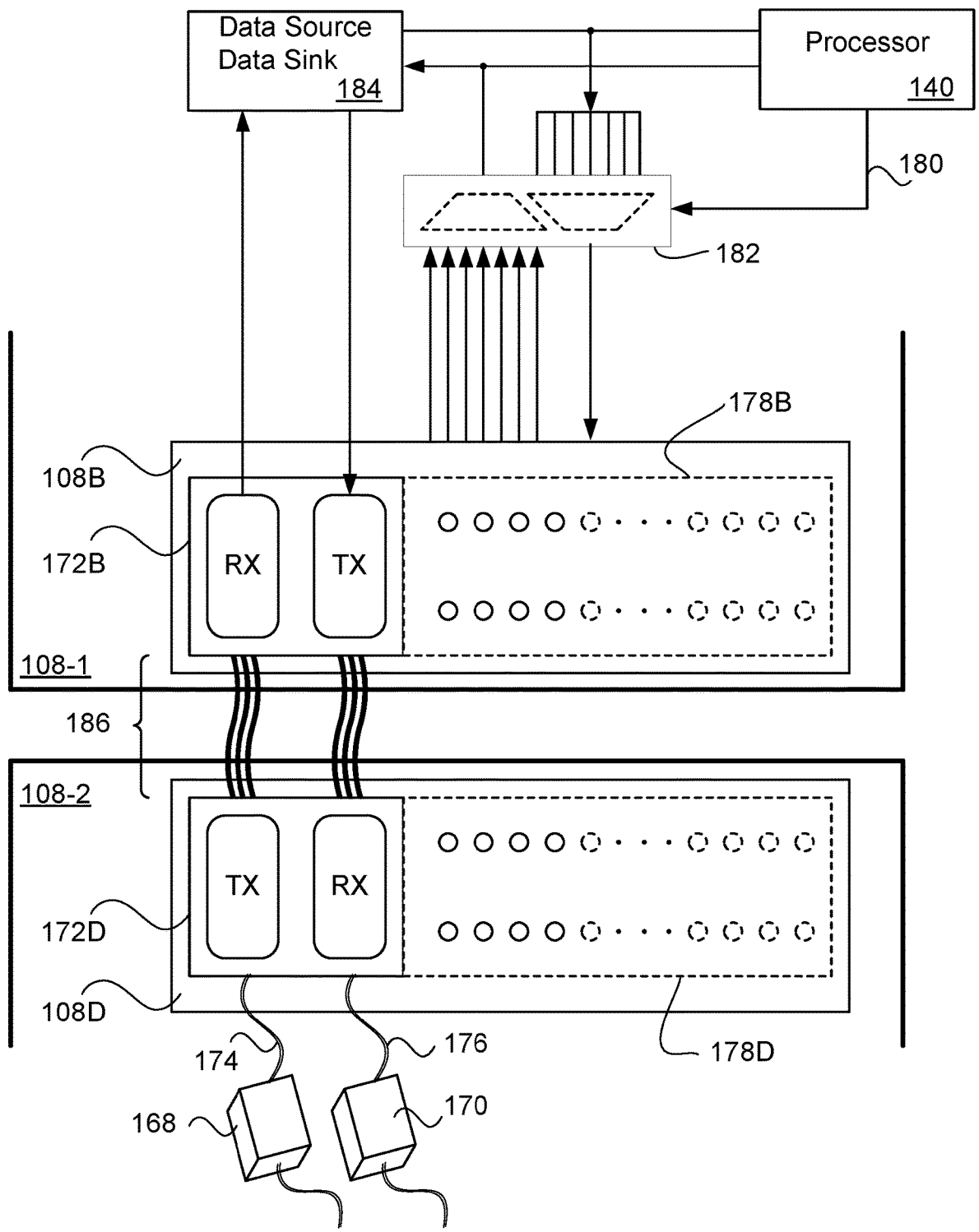
FIG. 16 is

FIG. 16 is a schematic of an interface embodiment between a first enhanced interface (EI) connector 108-1 and a second EI connector 108-2. The first EI connector 108-1 may be embodied in an aerial control fixture 100D arranged as a small cell or other wireless networking device (FIG. 15) or some other aerial control fixture 100. The second EI connector 108-2 may be embodied in a light fixture 110 or some other structure bearing an EI connector 108 as taught in the present disclosure.

In the embodiment of FIG. 16, the first EI connector 108-1 includes a controller-side secondary connector portion 108B, and the second EI connector 108-2 includes a fixture side secondary connector portion 108D.

In the embodiment of FIG. 16, the controller-side secondary connector portion 108B includes a first data communication element 172B, and the fixture side secondary connector portion 108D includes a second data communication element 172D. The first and second data communication elements 172B, 172D may correspond to each other based on proximity, identification parameter, pairing protocol, or in some other way. In other embodiments, each of secondary connector portions 108B, 108D may include two or more data communication elements 172B, 172D. In cases where two or more pairs of data communication elements 172B, 172D are included, additional features may be implemented. For example, multiple channels of high speed data may be communicated concurrently. In other cases, a first single communication element 172B, 172D may communicate with two or more communication elements 172B, 172D. Hence, embodiments of one-to-one communications are contemplated, and embodiments of one-to-many communications are contemplated.

In addition to the first and second data communication elements 172B, 172D respectively, each of the first and second secondary connector portions may optionally include any number of corresponding connectors 178B, 178B. In some cases, at least some of the connectors 178B, 178D are electromechanical connectors (e.g., pins, contacts, and the like) that mate when the first and second EI connectors 108-1, 108-2 are electromechanically coupled as described herein. In these or other cases, at least some of the connectors 178B, 178D form optical data paths.

Via a processor module 140, one or more selection lines 180, and one or more multiplexor circuits, the connectors 178B of the controller-side secondary connector portion 108B may be partitioned in any useful way. For example, in some cases, a first plurality of the connectors 178B may be arranged to perform Ethernet communications, and a second plurality of the connectors 178B may be arranged to perform universal serial bus (USB) communications. In other cases, various ones of the connectors 178B may be arranged to perform serial communications or communications according to some other protocol. In still other cases, one or more of the connectors 1786 may be arranged as discrete input ports, discrete output ports, or discrete input/output ports (I/O ports). In this way, signals (e.g., digital signals, analog signals, encoded signals, control signals, and any other type of signals) may be passed in to or out from the aerial control fixture 100. Connectors 178B may be hard-wired or programmatically changed at any convenient time. When the connectors are programmatically changeable, the changes may be directed by a user, a processor-executable software program, or some other means.

As evident in the embodiment of FIG. 16, data that passes through the secondary connector portion 108B of the EI connector 108-1 is highly configurable and coupleable to any number of data source/data sink elements 184. A non-limiting, non-exhaustive list of exemplary data source/data sink elements 184 include the processor module 140, input/output modules 144, wired transceiver module 146, cellular gateway 148A-148N, wireless transceiver module 156, location module 158, or any other data providing or data consuming module found in a device such as the aerial control fixtures 100 of the present disclosure. In this way, the devices taught in the present disclosure are also highly configurable, and the devices may be modified in advance, or in real time, to meet the needs of nearly any fixture-side implementation.

In the embodiment of FIG. 16, two data communication elements 172B, 172D are represented. As discussed herein, other numbers of data communication elements 172B, 172D may be included. The data communication elements 172B, 172D are RF-coupled elements, electromagnetic-coupled elements, inductive elements (e.g., near-field electromagnetic induction), or the data communication elements 172B, 172D may communicate using some other modality.

In some embodiments, the data communication elements 172B, 172D are arranged for point-to-point communications. In at least one embodiment, when the first and second enhanced interface (EI) connectors 108-1, 108-2 are electromechanically coupled as described herein, the data communication elements 172B, 172D are within a threshold distance 186 of each other. In at least one case, the threshold distance 186 is ten centimeters (10 cm), in other cases, the threshold distance 186 may be five centimeters (5 cm), two centimeters (2 cm), one centimeter (1 cm), five millimeters (5 mm), or some other distance. When the data communication elements 172B, 172D are operated within the threshold distance 186 of each other, the two devices may form and communicate via a high speed data connection as the term is described in the present disclosure.

In at least one embodiment, the data communication elements 172B, 172D have a small footprint of less than or equal to 100 square millimeters (100 mm$^2$), 50 square millimeters (50 mm$^2$), 25 square millimeters (25 mm$^2$), ten square millimeters (10 mm$^2$), or even smaller than four square millimeters (4 mm$^2$).

In at least one embodiment, the high speed data connection between two corresponding data communication elements 172B, 172D is capable of achieving uni-directional or bi-directional data rates of 500 megabits-per-second (500 Mbps), one gigabit per second (1 Gbps), two gigabits per second (2 Gbps), four gigabits per second (4 Gbps), six gigabits per second (6 Gbps), ten gigabits per second (10 Gbps), or some other even greater data rate. Slower data rates are also contemplated, and the parameters of such communications are programmatically configurable in at least some embodiments.

In at least some cases, the data communication elements 172B, 172D may communicate according to a fixed or dynamically programmable universal serial bus (USB) SuperSpeed protocol, a DisplayPort protocol, a serial ATA (SATA) protocol, a peripheral component interconnect express (PCIe) protocol, a V-by-One protocol, an Ethernet protocol, a universal asynchronous receiver transmitter (UART) protocol, a general purpose input/output (GPIO) customized protocol, and a serial peripheral interconnect (SPI) protocol. Other protocols are of course contemplated.

The term "high speed data connection," as used in the present disclosure includes data connections arranged to pass data at a rate of at least one million bits per second (1 Mbps). A high speed data connection does not need to achieve such a data rate in all uses, but the high speed data connections described in the present disclosure are arranged to pass data at such speeds if so configured. For the avoidance of doubt, high speed data connections of the present disclosure include, but are not limited to, connections used to pass data according to rates compatible with an Ethernet standard (e.g., 100 Mbps), an IEEE 802.11g WiFi standard (e.g., 54 Mbps), an IEEE 802.11n WiFi standard (e.g., 150 Mbps, 300 Mbps, and higher), a digital subscriber line (DSL) standard (e.g., 3 Mbps to 50 Mbps), a serial digital interface (SDI) standard (e.g., 270 Mbps to 540 Mbps), a Gigabit Ethernet standard (e.g., 1 Gbps), and a Terabit standard (e.g., 1000 Gbps), a 3G backhaul communications standard, a 4G backhaul communications standard, or a 5G backhaul communications standard.

The terms, "real-time" or "real time," as used herein and in the claims that follow, are not intended to imply instantaneous processing, transmission, reception, or otherwise as the case may be. Instead, the terms, "real-time" and "real time" imply that the activity occurs over an acceptably short period of time (e.g., over a period of microseconds or milliseconds), and that the activity may be performed on an ongoing basis (e.g., recording and reporting the collection of utility grade power metering data, recording and reporting IoT data, crowd control data, anomalous action data, and the like). An example of an activity that is not real-time is one that occurs over an extended period of time (e.g., hours or days)] or that occurs based on intervention or direction by a person or other activity.

Where the terms "substantial" or "about" in any grammatical form are used as modifiers in the present disclosure and any appended claims (e.g., to modify a structure, a dimension, a measurement, or some other characteristic), it is understood that the characteristic may vary by up to 30 percent. For example, a small cell networking device may be described as being mounted "substantially horizontal," In these cases, a device that is mounted exactly horizontal is mounted along an "X" axis and a "Y" axis that is normal (i.e., 90 degrees or at right angle) to a plane or line formed by a "Z" axis. Different from the exact precision of the term, "horizontal," and the use of "substantially" or "about" to modify the characteristic permits a variance of the particular characteristic by up to 30 percent. As another example, a small cell networking device having a particular linear dimension of between about six (6) inches and twelve (12) inches includes such devices in which the linear dimension varies by up to 30 percent. Accordingly, the particular linear dimension of the small cell networking device may be between 2.4 inches and 15.6 inches.

The terms "include" and "comprise" as well as derivatives thereof, in all of their syntactic contexts, are to be construed without limitation in an open, inclusive sense, (e.g., "including, but not limited to"). The term "or," is inclusive, meaning and/or. The phrases "associated with" and "associated therewith," as well as derivatives thereof, can be understood as meaning to include, be included within, interconnect with, contain, be contained within, connect to or with, couple to or with, be communicable with, cooperate with, interleave, juxtapose, be proximate to, be bound to or with, have, have a property of, or the like.

Unless the context requires otherwise, throughout the specification and claims which follow, the word "comprise" and variations thereof, such as, "comprises" and "comprising," are to be construed in an open, inclusive sense, e.g., "including, but not limited to."

Reference throughout this specification to "one embodiment" or "an embodiment" and variations thereof means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content and context clearly dictates otherwise. It should also be noted that the conjunctive terms, "and" and "or" are generally employed in the broadest sense to include "and/or" unless the content and context clearly dictates inclusivity or exclusivity as the case may be. In addition, the composition of "and" and "or" when recited herein as "and/or" is intended to encompass an embodiment that includes all of the associated items or ideas and one or more other alternative embodiments that include fewer than all of the associated items or ideas.

In the present disclosure, conjunctive lists make use of a comma, which may be known as an Oxford comma, a Harvard comma, a serial comma, or another like term. Such lists are intended to connect words, clauses or sentences such that the thing following the comma is also included in the list.

As described herein, for simplicity, a user is in some case described in the context of the male gender. For example, the terms "his," "him," and the like may be used. It is understood that a user can be of any gender, and the terms "he," "his," and the like as used herein are to be interpreted broadly inclusive of all known gender definitions.

As the context may require in this disclosure, except as the context may dictate otherwise, the singular shall mean the plural and vice versa; all pronouns shall mean and include the person, entity, firm or corporation to which they relate; and the masculine shall mean the feminine and vice versa.

When so arranged as described herein, each computing device may be transformed from a generic and unspecific computing device to a combination device comprising hardware and software configured for a specific and particular purpose. When so arranged as described herein, to the extent that any of the inventive concepts described herein are found by a body of competent adjudication to be subsumed in an abstract idea, the ordered combination of elements and limitations are expressly presented to provide a requisite inventive concept by transforming the abstract idea into a tangible and concrete practical application of that abstract idea.

The headings and Abstract of the Disclosure provided herein are for convenience only and do not limit or interpret the scope or meaning of the embodiments.

The terms roadside aerial lighting fixture, aerial fixture, aerial control fixture, controller, and the like are used broadly in the present disclosure. For example, the present disclosure may describe a roadside aerial lighting fixture as integrating, having, or otherwise including a light source. It is recognized that the light source may be an LED-based source, an incandescent light source, a gas-filled chamber based source, or any other light source, and the light source may or may not be "integrated" with the roadside aerial lighting fixture. Instead, the light source may be attached, coupled, co-located, or arranged in some other way in cooperation with the roadside aerial lighting fixture. As another example, a data connector may be described as integrated with, couple to, formed in, or co-located in some other way with a particular controller, and the controller may further be described as including or not including a housing, a translucent lens, any number of roadside standards-based connectors, one or more processors, memory, and the like. These broad uses of the terms are recited to express the inventive concepts of the present disclosure with clarity and brevity that will be appreciated by those of skill in the art.

The various embodiments described above can be combined to provide further embodiments. Aspects of the embodiments can be modified, if necessary to employ concepts of the various patents, application and publications to provide yet further embodiments.

Example A-1 is a system to couple a controller to a roadside aerial lighting fixture, comprising: a primary male connector integrated with the controller; a primary female connector integrated with the roadside aerial lighting fixture, wherein the primary male connector is arranged for substantially permanent coupling to the primary female connector, wherein the primary male and female connectors are compliant with a roadway area lighting standard promoted by a standards body; a first substantially planar surface integrated with the controller and having the primary male connector protruding therefrom, wherein electrical contacts of the primary male connector are arranged about a first central axis, the first central axis being substantially normal to the first substantially planar surface; a second substantially planar surface integrated with the roadside aerial lighting fixture and having the primary female connector recessed therein, wherein electrical contacts of the primary female connector are arranged about a second central axis, the second central axis being substantially normal to the second substantially planar surface; a controller-side data connector integrated with and protruding from the first substantially planar surface or a third surface substantially parallel to the first substantially planar surface; and a fixture-side data connector integrated with and recessed within the second substantially planar surface or recessed within a fourth surface substantially parallel to the second substantially planar surface, wherein the primary male connector is electrically coupled to the primary female connector and the controller-side data connector is communicatively coupled to the fixture-side data connector when the controller is rotatably coupled to the roadside aerial lighting fixture.

Example A-2 may include the subject matter of Example A-1, and alternatively or additionally any other example herein, wherein the primary male and primary female connectors are compliant with American National Standards Institute (ANSI) C136.

Example A-3 may include the subject matter of Example A-2, and alternatively or additionally any other example herein, wherein the primary male and primary female connectors are compliant with ANSI C136.41-2013.

Example A-4 may include the subject matter of any of Examples A1 to A-3, and alternatively or additionally any other example herein, wherein controller-side data connector and the fixture-side data connector are multi-conduit connectors arranged to pass packetized digital data.

Example A-5 may include the subject matter of any of Examples A-1 to A-4, and alternatively or additionally any other example herein, wherein the controller-side data connector and the fixture-side data connector are optically based connectors.

Example A-6 may include the subject matter of any of Examples A-1 to A-5, and alternatively or additionally any other example herein, wherein the controller-side data connector has a semi-circular shape arranged about the first central axis, wherein the fixture-side data connector has a semi-circular shape arranged about the second central axis, and wherein the fixture-side data connector receives the controller-side data connector when the controller is rotatably coupled to the roadside aerial lighting fixture.

Example A-7 may include the subject matter of any of Examples A-1 to A-6, and alternatively or additionally any other example herein, wherein the controller-side data connector includes a plurality of pins and wherein the fixture-side data connector includes a plurality of sockets, wherein each of the plurality of pins of the controller-side data connector has a corresponding socket in the fixture-side data connector.

Example A-8 may include the subject matter of any of Examples A-1 to A-7, and alternatively or additionally any other example herein, wherein the controller-side data connector includes a plurality of spring contacts and wherein the fixture-side data connector includes a plurality of contacts, wherein each of the plurality of spring contacts of the controller-side data connector has a corresponding contact in the fixture-side data connector.

Example A-9 may include the subject matter of any of Examples A-1 to A-8, and alternatively or additionally any other example herein, wherein the controller-side data connector includes a plurality of contacts and wherein the fixture-side data connector includes a plurality of contacts, wherein at least some of the plurality of contacts of the controller-side data connector or at least some of the plurality of contacts of the fixture-side data connector are spring contacts.

Example A-10 may include the subject matter of any of Examples A-1 to A-9, and alternatively or additionally any other example herein, wherein at least one of the controller-side data connector and the fixture-side data connector includes a registration feature.

Example A-11 may include the subject matter of any of Examples A-1 to A-10, and alternatively or additionally any other example herein, wherein the controller-side data connector is electromechanically coupled to the fixture-side data connector when the controller is rotatably coupled to the roadside aerial lighting fixture.

Example A-12 may include the subject matter of any of Examples A-1 to A-11, and alternatively or additionally any other example herein, wherein the primary male connector and the controller-side data connector are the only connectors associated with the first planar surface or the third surface.

Example A-13 may include the subject matter of any of Examples A-1 to A-12, and alternatively or additionally any other example herein, wherein the controller-side data connector is arranged to pass signals according to an Ethernet protocol.

Example A-14 may include the subject matter of any of Examples A-1 to A-13, and alternatively or additionally any other example herein, wherein the controller-side data connector is arranged to pass signals according to a power-over-Ethernet (PoE) protocol.

Example A-15 may include the subject matter of any of Examples A-1 to A-14, and alternatively or additionally any other example herein, wherein the controller-side data connector is communicatively coupleable to the fixture-side data connector absent any mechanical coupling of the controller-side data connector to the fixture-side data connector.

Example B-1 is an aerially mountable electronic control device, comprising: a first primary connector arranged for substantially permanent coupling to a corresponding second primary connector, wherein the first and second primary connectors are compliant with a roadway area lighting standard promoted by a standards body; a substantially planar surface having either protruding therefrom or recessed therein the first primary connector, wherein electrical contacts of the first primary connector are arranged about a central axis, the central axis being substantially normal to the planar surface; and integrated with the substantially planar surface or another surface parallel to the substantially planar surface, a first multi-conduit data connector arranged for substantially permanent coupling to a corresponding second multi-conduit data connector, wherein the first multi-conduit data connector is separate and distinct from the first primary connector.

Example B-2 may include the subject matter of Example B-1, and alternatively or additionally any other example herein, wherein the first multi-conduit data connector is arranged to partially rotate about the central axis when the aerially mountable electronic control device is rotatably coupled to a roadside aerial lighting fixture, said partial rotation arranged to form a communicative coupling between conduits of the first multi-conduit data connector and the corresponding second multi-conduit data connector.

Example B-3 may include the subject matter of any of Examples B-1 to B-2, and alternatively or additionally any other example herein, wherein the first multi-conduit data connector includes: a plurality of leaf spring contacts.

Example B-4 may include the subject matter of any of Examples B-1 to B-3, and alternatively or additionally any other example herein, wherein the first multi-conduit data connector includes: a plurality of pins aligned substantially parallel to the central axis.

Example B-5 may include the subject matter of any of Examples B-1 to B-4, and alternatively or additionally any other example herein, wherein the first multi-conduit data connector includes: a plurality of pins aligned substantially parallel to the substantially planar surface.

Example C-1 is a method, comprising: controlling a light source of a roadside aerial lighting fixture with a controller that is electrically coupled to the roadside aerial lighting fixture via a primary male connector integrated with the controller and a primary female connector integrated with the roadside aerial lighting fixture, wherein the primary male and female connectors are compliant with a roadway area lighting standard promoted by a standards body; and communicating control signals between the controller and the aerial lighting fixture, said control signals passing through a controller-side data connector integrated with the controller and a fixture-side data connector integrated with the roadside aerial lighting fixture, said controller-side data connector being communicatively coupled to the fixture-side data connector via the controller being rotatably coupled to the roadside aerial lighting fixture.

Example C-2 may include the subject matter of Example C-1, and alternatively or additionally any other example herein, wherein communicating the control signals includes communicating a stream of packet-based data to a remote computing device.

Example C-3 may include the subject matter of any of Examples C-1 and C-2, and alternatively or additionally any other example herein, wherein communicating the control signals includes communicating any one or more of high speed data, low speed data, power, digital signals, analog signals, and differential signals.

Example C-4 may include the subject matter of any of Examples C-1 to C-3, and alternatively or additionally any other example herein, wherein communicating the control signals includes forming a stream of light pulses with a controller-based light source and receiving the stream of light pulses with a fixture-side light detection circuit.

Example C-5 may include the subject matter of any of Examples C-1 to C-4, and alternatively or additionally any other example herein, wherein the control signals are arranged according to an Ethernet protocol.

Example C-6 may include the subject matter of any of Examples C-1 to C-5, and alternatively or additionally any other example herein, wherein the control signals are arranged according to any one or more of a Digital Visual Interface (DVI) protocol, a High Definition Media Interface (HDMI) protocol, a Universal Serial Bus (USB) protocol, a propriety standards protocol, or a non-standard protocol.

Example D-1 is a system, comprising: a plurality of aerial control fixtures, each one of the plurality of aerial control fixtures respectively coupled electromechanically to a corresponding one of a plurality of streetlight fixtures, and wherein each one of the plurality of streetlight fixtures includes at least one respective light source; a plurality of fixture-side enhanced interface connectors, each one of the plurality of fixture-side enhanced interface connectors respectively integrated with a corresponding one of the plurality of streetlight fixtures, wherein each of the fixture-side enhanced interface connectors includes: a primary female connector portion that is compliant with a roadway area lighting standard promoted by a standards body; and a fixture-side data connector compliant with a high speed data communications protocol; and a plurality of controller-side enhanced interface connectors, each one of the plurality of controller-side fixture-side enhanced interface connectors respectively integrated with a corresponding one of the plurality of aerial control fixtures, wherein each of the controller-side enhanced interface connectors includes: a primary male connector portion that is compliant with the roadway area lighting standard promoted by a standards body, wherein the primary female connector portion is arranged for electromechanical coupling with the primary male connector portion; and a controller-side data connector compliant with the high speed data communications protocol, wherein the at least one fixture-side data connector is arranged for communicative coupling with the at least one controller-side data connector.

Example D-2 may include the subject matter of Example D-1, and alternatively or additionally any other example herein, wherein the high speed data communications protocol is arranged to pass data at a rate of at least one million bits per second.

Example D-3 may include the subject matter of any of Examples D-1 and D-2, and alternatively or additionally any other example herein, wherein the high speed data communications protocol is arranged to pass data according to an Ethernet standard.

Example D-4 may include the subject matter of any of Examples D-1 to D-3, and alternatively or additionally any other example herein, wherein the high speed data communications protocol is arranged to pass data according to a digital subscriber line standard.

Example D-5 may include the subject matter of any of Examples D-1 to D-4, and alternatively or additionally any other example herein, wherein the high speed data communications protocol is arranged to pass data according to a wireless mobile communications network backhaul standard.

Example D-6 may include the subject matter of any of Examples D-1 to D-5, and alternatively or additionally any other example herein, wherein the high speed data communications protocol is arranged to pass data according to a 3G, 4G, or 5G backhaul communications standard.

Example D-7 may include the subject matter of any of Examples D-1 to D-6, and alternatively or additionally any other example herein, wherein the plurality of streetlight fixtures are coupled to or otherwise arranged as part of a system of streetlight poles.

Example D-8 may include the subject matter of any of Examples D-1 to D-7, and alternatively or additionally any other example herein, wherein at least one the plurality of streetlight fixtures is coupled to one or more buildings.

Example D-9 may include the subject matter of any of Examples D-1 to D-8, and alternatively or additionally any other example herein, wherein at least one the plurality of streetlight fixtures is coupled to one or more towers.

Example D-10 may include the subject matter of any of Examples D-1 to D-9, and alternatively or additionally any other example herein, wherein at least one the plurality of streetlight fixtures is coupled to one or more masts.

Example D-11 may include the subject matter of any of Examples D-1 to D-10, and alternatively or additionally any other example herein, wherein at least one the plurality of streetlight fixtures is coupled to one or more signs.

Example D-12 may include the subject matter of any of Examples D-1 to D-11, and alternatively or additionally any other example herein, wherein some or all of the plurality of aerial control fixtures are coupled to one or more buildings, one or more towers, one or more masts, or one or more signs.

Example D-13 may include the subject matter of any of Examples D-1 to D-12, and alternatively or additionally any other example herein, wherein at least some of the streetlight poles, streetlight fixtures, or light sources are controlled by a government agency.

Example D-14 may include the subject matter of any of Examples D-1 to D-13, and alternatively or additionally any other example herein, wherein at least some of the streetlight poles, streetlight fixtures, or light sources are controlled by a private entity.

Example D-15 may include the subject matter of any of Examples D-1 to D-14, and alternatively or additionally any other example herein, wherein an emergency services agency is empowered to take control of the system.

Example D-16 may include the subject matter of any of Examples D-1 to D-15, and alternatively or additionally any other example herein, wherein each respective light source is arranged between about 20 feet and 40 feet above the ground.

Example D-17 may include the subject matter of any of Examples D-1 to D-16, and alternatively or additionally any other example herein, wherein each aerial control fixture is arranged as a small cell networking device.

Example D-18 may include the subject matter of Example D-17, and alternatively or additionally any other example herein, wherein each small cell networking device is arranged to supplement cellular-based network coverage in a dense urban area.

Example D-19 may include the subject matter of Example D-17, and alternatively or additionally any other example herein, wherein each small cell networking device is arranged in a geographic regions that is otherwise a dark spot in a cellular network Example D-20 may include the subject matter of Example D-17, and alternatively or additionally any other example herein, wherein each small cell networking device is arranged in an area having only periodic high-traffic.

Example D-21 may include the subject matter of Example D-20, and alternatively or additionally any other example herein, wherein the area having only periodic high-traffic is an area near at least one of a stadium, an arena, a show venue, a construction site, or a disaster site.

Example D-22 may include the subject matter of Example D-17, and alternatively or additionally any other example herein, wherein each small cell networking device includes electronic circuits that provide small cell functionality to two or more mobile network operators in a single device.

Example D-23 may include the subject matter of Example D-17, and alternatively or additionally any other example herein, wherein each small cell networking device includes antennas, transceivers, and controllers, that permit two mobile devices provisioned for wireless communications on different cellular-based networks operated by different mobile network operators to carry on concurrent communication sessions.

Example D-24 may include the subject matter of Example D-23, and alternatively or additionally any other example herein, wherein the concurrent communication sessions include at least one of phone calls and internet sessions.

Example D-25 may include the subject matter of any of Examples D-1 to D-24, and alternatively or additionally any other example herein, wherein each aerial control fixture is arranged as a smart sensor device.

Example D-26 may include the subject matter of Example D-25, and alternatively or additionally any other example herein, wherein each smart sensor device is arranged to provide non-cellular-based wireless capabilities.

Example D-27 may include the subject matter of Example D-25, and alternatively or additionally any other example herein, wherein each smart sensor device is arranged local edge processing capabilities.

Example D-28 may include the subject matter of Example D-25, and alternatively or additionally any other example herein, wherein each smart sensor device is arranged to receive directions or other control information from a small cell networking device Example D-29 may include the subject matter of Example D-25, and alternatively or additionally any other example herein, wherein each smart sensor device is arranged to receive directions or other control information from a mobile device.

Example D-30 may include the subject matter of Example D-25, and alternatively or additionally any other example herein, wherein each smart sensor device is arranged to receive directions or other control information from another aerial control fixture Example D-31 may include the subject matter of Example D-25, and alternatively or additionally any other example herein, wherein each smart sensor device is arranged with a variable illumination algorithm, the variable illumination based on at least one of season, motion detection, and sound detection.

Example D-32 may include the subject matter of any of Examples D-1 to D-31, and alternatively or additionally any other example herein, wherein each aerial control fixture includes a light sensor circuit.

Example D-33 may include the subject matter of any of Examples D-1 to D-32, and alternatively or additionally any other example herein, wherein each aerial control fixture includes a processor-based light control circuit, the light control circuit configured to direct the at least one respective light source to provide visible light or to extinguish its visible light.

Example D-34 may include the subject matter of Example D-33, and alternatively or additionally any other example herein, wherein the processor-based light control circuit is arranged to provide a light control signal to its at least one respective light source, said light control signal based on at least one ambient light signal generated by an associated the light sensor.

Example D-35 may include the subject matter of Example D-33, and alternatively or additionally any other example herein, wherein the processor-based light control circuit is arranged to provide a light control signal to its at least one respective light source, said light control signal arranged to control a volume of light output from the at least one respective light source Example D-36 may include the subject matter of Example D-33, and alternatively or additionally any other example herein, wherein the processor-based light control circuit is arranged to provide a light control signal to its at least one respective light source, said light control signal arranged to control a color or frequency of light output from the at least one respective light source Example D-37 may include the subject matter of any of Examples D-1 to D-36, and alternatively or additionally any other example herein, wherein each aerial control fixture includes a transceiver, said transceiver arranged to receive light control information from a remote computing device.

Example D-38 may include the subject matter of any of Examples D-1 to D-37, and alternatively or additionally any other example herein, wherein each aerial control fixture includes a transceiver, said transceiver arranged to communicate with a plurality of corresponding transceivers, each of the plurality of corresponding transceivers formed in a respective one of a plurality of aerial control fixtures.

Example D-39 may include the subject matter of any of Examples D-1 to D-38, and alternatively or additionally any other example herein, wherein at least some of the plurality of streetlight fixtures are about 50 feet apart from others of the plurality of streetlight fixtures.

Example D-40 may include the subject matter of any of Examples D-1 to D-39, and alternatively or additionally any other example herein, wherein at least some of the plurality of streetlight fixtures are about 100 feet apart from others of the plurality of streetlight fixtures.

Example D-41 may include the subject matter of any of Examples D-1 to D-40, and alternatively or additionally any other example herein, wherein at least some of the plurality of streetlight fixtures are about 250 feet apart from others of the plurality of streetlight fixtures.

Example D-42 may include the subject matter of any of Examples D-1 to D-41, and alternatively or additionally any other example herein, wherein each of the plurality of streetlight fixtures is electrically coupled to a street cabinet that provides wired utility power.

Example D-43 may include the subject matter of Example D-42, and alternatively or additionally any other example herein, wherein the wired utility power is 120 VAC power.

Example D-44 may include the subject matter of Example D-42, and alternatively or additionally any other example herein, wherein the wired utility power is 240 VAC power.

Example D-45 may include the subject matter of Example D-42, and alternatively or additionally any other example herein, wherein the wired utility power is 260 VAC power.

Example D-46 may include the subject matter of any of Examples D-1 to D-45, and alternatively or additionally any other example herein, wherein each of the plurality of streetlight fixtures is communicatively coupled to a street cabinet via a wired backhaul connection.

Example D-47 may include the subject matter of Example D-46, and alternatively or additionally any other example herein, wherein each of the street cabinet that provides wired utility power to each of the plurality of streetlight fixtures.

Example D-48 may include the subject matter of any of Examples D-1 to D-47, and alternatively or additionally any other example herein, wherein one or more wired backhaul connections includes one or more of copper wire, fiber optic cable, and industrial Ethernet cable.

Example D-49 may include the subject matter of any of Examples D-1 to D-48, and alternatively or additionally any other example herein, wherein one or more wired backhaul connections is configured to provide power over Ethernet (PoE)

Example D-50 may include the subject matter of any of Examples D-1 to D-49, and alternatively or additionally any other example herein, wherein one or more wired backhaul connections is configured to provide communications according to a powerline communications protocol.

Example D-51 may include the subject matter of any of Examples D-1 to D-50, and alternatively or additionally any other example herein, wherein one or more wired backhaul connections is coupled to a public switched telephone network (PSTN).

Example D-52 may include the subject matter of any of Examples D-1 to D-51, and alternatively or additionally any other example herein, wherein the system includes a first plurality of aerial control fixtures arranged as smart sensor devices, said first plurality of aerial control fixtures configured for direct or indirect wireless communication with a second plurality of aerial control fixtures arranged as small cell networking devices.

Example D-53 may include the subject matter of Example D-52, and alternatively or additionally any other example herein, wherein the first plurality of aerial control fixtures and second plurality of aerial control fixtures are configured for direct or indirect wireless communication with a remote computing device that is controlled by a mobile network operator (MNO), a municipality, a government agency, or a private party entity.

Example D-54 may include the subject matter of Example D-52, and alternatively or additionally any other example herein, wherein the remote computing device is arranged to wirelessly communicate light control signals and packetized data to any one or more of the first plurality of aerial control fixtures and second plurality of aerial control fixtures.

Example D-55 may include the subject matter of any of Examples D-1 to D-54, and alternatively or additionally any other example herein, wherein each aerial control fixture arranged as a small cell networking device is configured to form an unlicensed wireless communication session with a first mobile device transceiver and further configured to form a cellular-based wireless communication session a second mobile transceiver.

Example D-56 may include the subject matter of Example D-55, and alternatively or additionally any other example herein, wherein the first mobile device transceiver and the second mobile transceiver are arranged in a same mobile device.

Example D-57 may include the subject matter of any of Examples D-1 to D-56, and alternatively or additionally any other example herein, wherein each aerial control fixture includes a plurality of sealable connectors each arranged to pass at least one signaling cable.

Example D-58 may include the subject matter of Example D-57, and alternatively or additionally any other example herein, wherein the at least one signaling cable is structured as a Power over Ethernet (PoE) cable.

Example D-59 may include the subject matter of Example D-57, and alternatively or additionally any other example herein, wherein the at least one signaling cable is structured for coupling to a camera device.

Example D-60 may include the subject matter of Example D-57, and alternatively or additionally any other example herein, wherein the at least one signaling cable is structured for coupling to an Internet of Things (IoT) device.

Example D-61 may include the subject matter of Example D-57, and alternatively or additionally any other example herein, wherein the at least one signaling cable is structured for coupling to a transducer.

Example D-62 may include the subject matter of any of Examples D-1 to D-61, and alternatively or additionally any other example herein, wherein the system further comprises a plurality of second aerial control fixtures, each one of the plurality of second aerial control fixtures respectively coupled electromechanically to a corresponding one of the plurality of aerial light control fixtures.

Example D-63 may include the subject matter of Example D-62, and alternatively or additionally any other example herein, wherein each of the plurality of second aerial control fixtures is a smart sensor device and each of the plurality of control fixtures is arranged as a small cell networking device.

Example D-64 may include the subject matter of any of Examples D-1 to D-63, and alternatively or additionally any other example herein, wherein each of the plurality of aerial light control fixtures includes a second primary female connector, the second primary female connector electrically coupled through the respective aerial light control fixture to the primary male connector portion.

Example D-65 may include the subject matter of any of Examples D-1 to D-64, and alternatively or additionally any other example herein, wherein primary female connector portion and the primary male connector portion are compliant with at least one of American National Standards Institute (ANSI) C136 and ANSI C136.41-2013.

Example D-66 may include the subject matter of any of Examples D-1 to D-65, and alternatively or additionally any other example herein, wherein primary female connector portion and the primary male connector portion are arranged about a central axis.

Example D-67 may include the subject matter of any of Examples D-1 to D-66, and alternatively or additionally any other example herein, wherein the fixture-side data connector and the controller-side data connector are multi-conduit connectors arranged to pass packetized digital data.

Example D-68 may include the subject matter of any of Examples D-1 to D-67, and alternatively or additionally any other example herein, wherein the fixture-side data connector and the controller-side data connector are optically based connectors.

Example D-69 may include the subject matter of any of Examples D-1 to D-68, and alternatively or additionally any other example herein, wherein the fixture-side data connector and the controller-side data connector each have a mating semi-circular shape arranged about a first central axis, and wherein the fixture-side data connector is arranged to receive the controller-side data connector when the respective aerial control fixture is rotatably coupled to the corresponding respective streetlight fixture.

Example D-70 may include the subject matter of any of Examples D-1 to D-69, and alternatively or additionally any other example herein, wherein the fixture-side data connector and the controller-side data connector, when communicatively coupled, are arranged to communicate packetized data via at least one of an Ethernet protocol and a Universal Serial Bus (USB) protocol.

Example D-71 may include the subject matter of any of Examples D-1 to D-70, and alternatively or additionally any other example herein, wherein the fixture-side data connector and the controller-side data connector, when communicatively coupled, are arranged to concurrently communicate data via both an Ethernet protocol and a Universal Serial Bus (USB) protocol.

Example D-72 may include the subject matter of any of Examples D-1 to D-71, and alternatively or additionally any other example herein, wherein the fixture-side data connector and the controller-side data connector, when communicatively coupled, are configurably arranged to communicate data via one of a plurality of communication protocols. The data may be packetized or un-packetized.

Example D-73 may include the subject matter of any of Examples D-1 to D-72, and alternatively or additionally any other example herein, wherein the fixture-side data connector and the controller-side data connector, when communicatively coupled, are configurably arranged to concurrently communicate data via at least two different communication protocols.

Example D-74 may include the subject matter of any of Examples D-1 to D-73, and alternatively or additionally any other example herein, wherein the fixture-side data connector and the controller-side data connector, when communicatively coupled, are configurable via at least one of a user interface, a manufacturing interface, a network interface, a computerized interface, an auto-negotiation, or a prioritized selection.

Example D-75 may include the subject matter of any of Examples D-1 to D-74, and alternatively or additionally any other example herein, wherein the fixture-side data connector and the controller-side data connector are arranged as a set of receptacles, a set of pads, a combination of pins and receptacles, spring contacts, leaf spring contacts, pogo pins, or connectors.

Example D-76 may include the subject matter of any of Examples D-1 to D-75, and alternatively or additionally any other example herein, wherein the primary female connector and the fixture-side data connector integrated in a same first housing and the primary male connector and the controller-side data connector are integrated in a same second housing.

Example D-77 may include the subject matter of any of Examples D-1 to D-76, and alternatively or additionally any other example herein, wherein the controller-side data connector is arranged as a protruding controller-side data connector, and wherein the fixture side data connector is arranged as a recessed fixture-side data connector arranged to mate with the protruding controller-side data connector when the respective aerial control fixture is rotatably coupled to the corresponding respective streetlight fixture.

Example D-78 may include the subject matter of any of Examples D-1 to D-77, and alternatively or additionally any other example herein, wherein each of the aerial control fixtures includes a plurality of communicatively coupled modular circuit boards.

Example D-79 may include the subject matter of any of Examples D-1 to D-78, and alternatively or additionally any other example herein, wherein a plurality of conduits electrically coupled to the primary male connector portion pass through at least one aperture in each of the plurality of communicatively coupled modular circuit boards.

Example D-80 may include the subject matter of Example D-78, and alternatively or additionally any other example herein, wherein the plurality of communicatively coupled modular circuit boards include a first coupling structure according to a power bus, a second coupling structure 130 according to a data bus, a third coupling structure arranged to pass conduits of the primary male connector portion and a fourth coupling structure arranged to pass conduits of the controller-side data connector.

Example D-81 may include the subject matter of any of Examples D-1 to D-80, and alternatively or additionally any other example herein, wherein the fixture-side data connector and the controller-side data connector, when coupled, are arranged to form at least one of an optical communication path, an RF-communication path, and an electromagnetic communication path.

Example D-82 may include the subject matter of any of Examples D-1 to D-81, and alternatively or additionally any other example herein, wherein the fixture-side data connector and the controller-side data connector, when coupled, are arranged to form a multi-conduit communication path.

Example D-83 may include the subject matter of Example D-82, and alternatively or additionally any other example herein, wherein the multi-conduit communication path includes between four and twelve conduits.

Example D-84 may include the subject matter of any of Examples D-1 to D-83, and alternatively or additionally any other example herein, wherein the fixture-side data connector and the controller-side data connector, when coupled, contribute to a mechanical coupling of the respective aerial control fixture to the corresponding respective streetlight fixture.

Example D-85 may include the subject matter of any of Examples D-1 to D-84, and alternatively or additionally any other example herein, wherein each aerial control fixture includes a set of dimming signal contacts arranged to pass dimming control signals, and each streetlight fixture includes a set of corresponding dimming contacts arranged to pass the dimming control signals.

Example D-86 may include the subject matter of any of Examples D-1 to D-85, and alternatively or additionally any other example herein, wherein each aerial control fixture includes a processor-based light control circuit, the light control circuit configured to direct the at least one respective light source to provide visible light or to extinguish its visible light based on a set of dimming control signals.

Example E-1 is a system to couple a controller to a roadside aerial lighting fixture, comprising: a primary male connector integrated with the controller; a primary female connector integrated with the roadside aerial lighting fixture, wherein the primary male connector is arranged for substantially permanent coupling to the primary female connector, wherein the primary male and female connectors are compliant with a roadway area lighting standard promoted by a standards body; a first substantially planar surface integrated with the controller and having the primary male connector protruding therefrom, wherein electrical contacts of the primary male connector are arranged about a first central axis, the first central axis being substantially normal to the first substantially planar surface; a second substantially planar surface integrated with the roadside aerial lighting fixture and having the primary female connector recessed therein, wherein electrical contacts of the primary female connector are arranged about a second central axis, the second central axis being substantially normal to the second substantially planar surface; a controller-side high speed communications data element integrated with the primary male connector and proximal to the first substantially planar surface; and a fixture-side high speed communications data element integrated with the primary female connector and proximal to the second substantially planar surface, wherein the primary male connector is electrically coupled to the primary female connector and the controller-side high speed communications data element is arranged for point-to-point high speed data communication with the fixture-side high speed communications data element when the controller is rotatably coupled to the roadside aerial lighting fixture.

Example E-2 may include the subject matter of Example E-1, and alternatively or additionally any other example herein, wherein the controller-side high speed communications data element and the fixture-side high speed communications data element are RF-coupled elements.

Example E-3 may include the subject matter of any of Examples E-1 to E-2, and alternatively or additionally any other example herein, wherein the controller-side high speed communications data element and the fixture-side high speed communications data element are electromagnetic-coupled elements, inductive elements, or near-field electromagnetic induction elements.

Example E-4 may include the subject matter of any of Examples E-1 to E-3, and alternatively or additionally any other example herein, wherein the controller-side high speed communications data element is within five centimeters of the fixture-side high speed communications data element when the controller is rotatably coupled to the roadside aerial lighting fixture.

Example E-5 may include the subject matter of Example E-4, and alternatively or additionally any other example herein, wherein the controller-side high speed communications data element is within one centimeter of the fixture-side high speed communications data element when the controller is rotatably coupled to the roadside aerial lighting fixture.

Example E-6 may include the subject matter of any of Examples E-1 to E-5, and alternatively or additionally any other example herein, wherein the controller-side high speed communications data element is arranged to communicate according to one of a plurality of communications protocols, the plurality of communications protocols including at least two of a universal serial bus (USB) SuperSpeed protocol, a DisplayPort protocol, a serial ATA (SATA) protocol, a peripheral component interconnect express (PCIe) protocol, a V-by-One protocol, an Ethernet protocol, a universal asynchronous receiver transmitter (UART) protocol, a general purpose input/output (GPIO) customized protocol, and a serial peripheral interconnect (SPI) protocol.

Example E-7 may include the subject matter of any of Examples E-1 to E-6, and alternatively or additionally any other example herein, wherein the controller-side high speed communications data element is arranged to communicate according to one of a plurality of communications protocols, the one of the plurality of communications protocols being programmatically configurable.

Example E-8 may include the subject matter of any of Examples E-1 to E-7, and alternatively or additionally any other example herein, wherein the primary male and primary female connectors are compliant with American National Standards Institute (ANSI) C136.

Example E-9 may include the subject matter of Example E-8, and alternatively or additionally any other example herein, wherein the primary male and primary female connectors are compliant with ANSI C136.41-2013

Example E-10 may include the subject matter of any of Examples E-1 to E-9, and alternatively or additionally any other example herein, further comprising: at least one sidewall connector, the at least one sidewall connector arranged in a sidewall of the primary male connector or a sidewall of the primary female connector.

Example E-11 may include the subject matter of any of Examples E-1 to E-10, and alternatively or additionally any other example herein, further comprising: at least one high speed data conversion module arranged to convert data passing through the controller-side high speed communications data element and fixture-side high speed communications data element into a form compatible for transmission via an optical fiber.

Example E-12 may include the subject matter of any of Examples E-1 to E-11, and alternatively or additionally any other example herein, further comprising: at least one high speed data conversion module arranged to convert data passing through an optical fiber into a form compatible for transmission via the controller-side high speed communications data element and fixture-side high speed communications data element.

Example E-13 may include the subject matter of any of Examples E-1 to E-12, and alternatively or additionally any other example herein, further comprising: a controller-side data connector integrated with the first substantially planar surface or a third surface substantially parallel to the first substantially planar surface; and a fixture-side data connector integrated with the second substantially planar surface or a fourth surface substantially parallel to the second substantially planar surface, wherein the controller-side data connector is communicatively coupled to the fixture-side data connector when the controller is rotatably coupled to the roadside aerial lighting fixture.

Example E-14 may include the subject matter of Example E-13, and alternatively or additionally any other example herein, further comprising: at least one multiplexor circuit, wherein the controller-side data connector and the fixture-side data connector each have a plurality of individual connectors, and wherein the at least one multiplexor circuit is arranged to define which of a plurality of functions will be enabled via at least some of the plurality of individual connectors.

Example F-1 is an aerially mountable electronic control device, comprising: a first primary connector arranged for substantially permanent coupling to a corresponding second primary connector, wherein the first and second primary connectors are compliant with a roadway area lighting standard promoted by a standards body; a substantially planar surface having either protruding therefrom or recessed therein the first primary connector, wherein electrical contacts of the first primary connector are arranged about a central axis, the central axis being substantially normal to the planar surface; and at least one high speed communications data element integrated with each of the first primary connector and the corresponding second primary connector, the at least two high speed communications data elements arranged for point-to-point communications with each other when the first primary connector is rotatably coupled to the second primary connector.

Example F-2 may include the subject matter of Example F-1, and alternatively or additionally any other example herein, further comprising: at least one high speed data conversion module arranged to convert data passing through the at least two high speed communications data elements into a form compatible for transmission via an optical fiber.

Example F-3 may include the subject matter of any of Examples F-1 to F-2, and alternatively or additionally any other example herein, further comprising: at least one high speed data conversion module arranged to convert data passing through an optical fiber into a form compatible for transmission via the at least two high speed communications data elements.

Example F-4 may include the subject matter of any of Examples F-1 to F-3, and alternatively or additionally any other example herein, further comprising: at least one power module electrically coupled to one of the first and second primary connectors and arranged to power at least one of the at least two high speed communications data elements.

Example G-1 is a method, comprising: controlling a light source of a roadside aerial lighting fixture with a controller that is electrically coupled to the roadside aerial lighting fixture via a primary male connector integrated with the controller and a primary female connector integrated with the roadside aerial lighting fixture, wherein the primary male and female connectors are compliant with a roadway area lighting standard promoted by a standards body; and communicating data via a high speed data connection having a first high speed communications data element integrated with the primary male connector and a second high speed communications data element integrated with the primary female connector.

Example G-2 may include the subject matter of Example G-1, and alternatively or additionally any other example herein, wherein the first and second high speed communications data elements form at least one of a point-to-point RF-coupled high speed data connection, an electromagnetic-coupled high speed data connection, and an induction-coupled high speed data connection.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system to couple a controller to a roadside aerial lighting fixture, comprising:
   a primary male connector integrated with the controller;
   a primary female connector integrated with the roadside aerial lighting fixture, wherein the primary male connector is arranged for substantially permanent coupling to the primary female connector, wherein the primary male and female connectors are compliant with a roadway area lighting standard promoted by a standards body;
   a first substantially planar surface integrated with the controller and having the primary male connector protruding therefrom, wherein electrical contacts of the primary male connector are arranged about a first central axis, the first central axis being substantially normal to the first substantially planar surface;
   a second substantially planar surface integrated with the roadside aerial lighting fixture and having the primary female connector recessed therein, wherein electrical contacts of the primary female connector are arranged about a second central axis, the second central axis being substantially normal to the second substantially planar surface;
   a controller-side high speed communications data element integrated with the primary male connector and proximal to the first substantially planar surface;
   a fixture-side high speed communications data element integrated with the primary female connector and proximal to the second substantially planar surface, wherein the primary male connector is electrically coupled to the primary female connector and the controller-side high speed communications data element is arranged for point-to-point high speed data communication with the fixture-side high speed communications data element when the controller is rotatably coupled to the roadside aerial lighting fixture; and
   at least one sidewall connector, the at least one sidewall connector arranged in a sidewall of the primary male connector or a sidewall of the primary female connector.

2. The system of claim 1, wherein the controller-side high speed communications data element and the fixture-side high speed communications data element are RF-coupled elements.

3. The system of claim 1, wherein the controller-side high speed communications data element and the fixture-side high speed communications data element are electromagnetic-coupled elements, inductive elements, or near-field electromagnetic induction elements.

4. The system of claim 1, wherein the controller-side high speed communications data element is within five centimeters of the fixture-side high speed communications data element when the controller is rotatably coupled to the roadside aerial lighting fixture.

5. The system of claim 4, wherein the controller-side high speed communications data element is within one centimeter of the fixture-side high speed communications data element when the controller is rotatably coupled to the roadside aerial lighting fixture.

6. The system of claim 1, wherein the controller-side high speed communications data element is arranged to communicate according to one of a plurality of communications protocols, the plurality of communications protocols including at least two of a universal serial bus (USB) SuperSpeed protocol, a DisplayPort protocol, a serial ATA (SATA) protocol, a peripheral component interconnect express (PCIe) protocol, a V-by-One protocol, an Ethernet protocol, a universal asynchronous receiver transmitter (UART) protocol, a general purpose input/output (GPIO) customized protocol, and a serial peripheral interconnect (SPI) protocol.

7. The system of claim 1, wherein the controller-side high speed communications data element is arranged to communicate according to one of a plurality of communications protocols, the one of the plurality of communications protocols being programmatically configurable.

8. The system of claim 1, wherein the primary male and primary female connectors are compliant with American National Standards Institute (ANSI) C136.

9. The system of claim 8, wherein the primary male and primary female connectors are compliant with ANSI C136.41-2013.

10. The system of claim 1, further comprising:
    at least one high speed data conversion module arranged to convert data passing through the controller-side high speed communications data element and fixture-side high speed communications data element into a form compatible for transmission via an optical fiber.

11. The system of claim 1, further comprising:
    at least one high speed data conversion module arranged to convert data passing through an optical fiber into a form compatible for transmission via the controller-side high speed communications data element and fixture-side high speed communications data element.

12. The system of claim 1, further comprising:
    a controller-side data connector integrated with the first substantially planar surface or a third surface substantially parallel to the first substantially planar surface; and
    a fixture-side data connector integrated with the second substantially planar surface or a fourth surface substantially parallel to the second substantially planar surface, wherein the controller-side data connector is communicatively coupled to the fixture-side data connector when the controller is rotatably coupled to the roadside aerial lighting fixture.

13. The system of claim 12, further comprising:
    at least one multiplexor circuit, wherein the controller-side data connector and the fixture-side data connector each have a plurality of individual connectors, and wherein the at least one multiplexor circuit is arranged to define which of a plurality of functions will be enabled via at least some of the plurality of individual connectors.

14. The system of claim 1, further comprising:
    at least one power module electrically coupled to one of the primary male and primary female connectors and arranged to power at least one of the controller-side and fixture-side high speed communications data elements.

15. The method system of claim 1, wherein at least one signal conduit passing through the at least one sidewall connector is configured as a power signal, a high speed data connection signal, a low speed data signal, or a control signal.

* * * * *

UNITED STATES PATENT AND TRADEMARK OFFICE
CERTIFICATE OF CORRECTION

PATENT NO. : 10,873,170 B2
APPLICATION NO. : 16/403324
DATED : December 22, 2020
INVENTOR(S) : Ronald B. Zimmerman et al.

It is certified that error appears in the above-identified patent and that said Letters Patent is hereby corrected as shown below:

In the Claims

<u>Column 44, Line 57:</u>
"15. The method system of claim 1, wherein at least one" should read, --15. The system of claim 1, wherein at least one--.

Signed and Sealed this
Twenty-ninth Day of June, 2021

Drew Hirshfeld
*Performing the Functions and Duties of the*
*Under Secretary of Commerce for Intellectual Property and*
*Director of the United States Patent and Trademark Office*